US012755331B2

(12) United States Patent
Stepuch

(10) Patent No.: US 12,755,331 B2
(45) Date of Patent: Oct. 6, 2026

(54) STORING GRAPHICS PROCESSING PRIMITIVE INFORMATION

(71) Applicant: Arm Limited, Cambridge (GB)

(72) Inventor: Rafał Stepuch, Cambridge (GB)

(73) Assignee: Arm Limited, Cambridge (GB)

( * ) Notice: Subject to any disclaimer, the term of this patent is extended or adjusted under 35 U.S.C. 154(b) by 92 days.

(21) Appl. No.: 18/612,412

(22) Filed: Mar. 21, 2024

(65) Prior Publication Data

US 2025/0299288 A1 Sep. 25, 2025

(51) Int. Cl.

*G06T 1/20* (2006.01)
*G06T 1/60* (2006.01)
*G06T 11/20* (2026.01)

(52) U.S. Cl.

CPC .................. *G06T 1/60* (2013.01); *G06T 1/20* (2013.01); *G06T 11/20* (2013.01); *G06T 2210/12* (2013.01)

(58) Field of Classification Search

CPC ... G06T 1/20; G06T 1/60; G06T 11/20; G06T 15/005; G06T 2210/12
USPC .................................................. 345/506, 543
See application file for complete search history.

(56) References Cited

U.S. PATENT DOCUMENTS

| | | | | |
|---|---|---|---|---|
| 7,170,513 | B1 | 1/2007 | Voorhies et al. | |
| 8,773,422 | B1 | 7/2014 | Garland | |
| 9,536,341 | B1 | 1/2017 | Rhoades | |
| 9,905,037 | B2 | 2/2018 | Boudier | |
| 11,372,645 | B2 * | 6/2022 | Poole | G06F 9/4881 |
| 11,727,528 | B2 | 8/2023 | Doyle et al. | |
| 11,922,555 | B2 | 3/2024 | Jesus et al. | |
| 2011/0261059 | A1 | 10/2011 | Keall et al. | |
| 2012/0229464 | A1 | 9/2012 | Fishwick | |
| 2014/0078143 | A1 | 3/2014 | Lee et al. | |
| 2014/0118365 | A1 | 5/2014 | Hakura | |
| 2014/0118393 | A1 | 5/2014 | Hakura et al. | |
| 2015/0089156 | A1 | 3/2015 | Clohset et al. | |
| 2015/0145873 | A1 | 5/2015 | Akenine-Moller | |
| 2015/0348306 | A1 | 12/2015 | Yang | |
| 2016/0005140 | A1 | 1/2016 | Engh-Halstvedt et al. | |
| 2016/0071312 | A1 | 3/2016 | Laine et al. | |
| 2016/0078588 | A1 | 3/2016 | Garanzha | |

(Continued)

FOREIGN PATENT DOCUMENTS

CN 117726743 A1 3/2024

OTHER PUBLICATIONS

International Search Report & The Written Opinion of the International Searching Authority dated Sep. 16, 2025, International Application No. PCT/GB2025/050575.

(Continued)

*Primary Examiner* — Jacinta M Crawford
(74) *Attorney, Agent, or Firm* — Pearl Cohen LLP

(57) ABSTRACT

A tile-based graphics processing system is disclosed. The graphics processing system is operable to generate a render output by generating and storing primitive information representative of positions of primitives to be processed to generate the render output, and reading and using the primitive information to identify primitives to process to generate a rendering tile of the render output. The tile-based graphics processing system stores primitive information in a set of linked blocks of memory space, at least one block of which comprises links to at least two other blocks, at least one of which does not comprise any links to any other blocks.

19 Claims, 20 Drawing Sheets

(56) References Cited

U.S. PATENT DOCUMENTS

| | | | |
|---|---|---|---|
| 2016/0163014 | A1 | 6/2016 | Yang et al. |
| 2016/0364901 | A1 | 12/2016 | Balci et al. |
| 2017/0330372 | A1 | 11/2017 | Kakarlapudi et al. |
| 2018/0293782 | A1 | 10/2018 | Benthin et al. |
| 2018/0300939 | A1 | 10/2018 | Benthin et al. |
| 2019/0035147 | A1 | 1/2019 | Hazel |
| 2019/0102865 | A1 | 4/2019 | Hensley et al. |
| 2020/0050451 | A1 | 2/2020 | Babich |
| 2020/0050550 | A1 | 2/2020 | Muthler et al. |
| 2020/0051316 | A1 | 2/2020 | Laine |
| 2020/0051317 | A1 | 2/2020 | Muthler |
| 2021/0027533 | A1 | 1/2021 | Ruud |
| 2021/0158584 | A1* | 5/2021 | Chalfin ..................... G06T 1/60 |
| 2021/0248805 | A1* | 8/2021 | Jesus ....................... G06T 17/10 |
| 2021/0287429 | A1 | 9/2021 | Vaidyanathan et al. |
| 2021/0295584 | A1* | 9/2021 | Engh-Halstvedt ........ G06T 1/20 |
| 2021/0304489 | A1 | 9/2021 | Saeed et al. |
| 2021/0390758 | A1 | 12/2021 | Muthler |
| 2022/0036639 | A1 | 2/2022 | Rabbani |
| 2022/0036652 | A1 | 2/2022 | Rabbani |
| 2022/0198739 | A1 | 6/2022 | Saleh et al. |
| 2023/0099806 | A1 | 3/2023 | Oldcom |
| 2023/0109412 | A1 | 4/2023 | Gruen |
| 2023/0206378 | A1 | 6/2023 | Morrical |
| 2023/0252685 | A1 | 8/2023 | Babu |
| 2023/0252716 | A1 | 8/2023 | McAllister |
| 2023/0252718 | A1 | 8/2023 | Fenney |
| 2023/0252725 | A1 | 8/2023 | McAllister |
| 2023/0260194 | A1 | 8/2023 | Clark |
| 2023/0334736 | A1 | 10/2023 | Goswami et al. |
| 2023/0388651 | A1 | 11/2023 | Larsen |
| 2023/0394739 | A1 | 12/2023 | Usher |
| 2023/0410407 | A1 | 12/2023 | Gupta |
| 2024/0009226 | A1 | 1/2024 | Muthler et al. |
| 2024/0095994 | A1 | 3/2024 | Muthler |
| 2024/0104824 | A1 | 3/2024 | Gupta |
| 2024/0104844 | A1 | 3/2024 | Ikeda |
| 2024/0112392 | A1 | 4/2024 | Pankratz et al. |
| 2024/0112397 | A1 | 4/2024 | Brennan |
| 2024/0144580 | A1 | 5/2024 | Reyes |
| 2024/0144581 | A1 | 5/2024 | Eker |
| 2024/0249466 | A1 | 7/2024 | Bourd |
| 2024/0312117 | A1 | 9/2024 | Lu |
| 2024/0404176 | A1 | 12/2024 | Brennan |
| 2025/0022204 | A1 | 1/2025 | Babu |
| 2025/0046015 | A1 | 2/2025 | Saucedo |
| 2025/0104330 | A1 | 3/2025 | Dietrich et al. |
| 2025/0111585 | A1 | 4/2025 | Reyes |
| 2025/0111586 | A1 | 4/2025 | Livesley |
| 2025/0131523 | A1 | 4/2025 | Langtind et al. |
| 2025/0131638 | A1 | 4/2025 | Mitra et al. |
| 2025/0131639 | A1 | 4/2025 | Barczak et al. |
| 2025/0131641 | A1 | 4/2025 | McAllister et al. |
| 2025/0131653 | A1 | 4/2025 | Langtind et al. |
| 2025/0173812 | A1 | 5/2025 | Pankratz et al. |
| 2025/0200864 | A1 | 6/2025 | Kern et al. |
| 2025/0244976 | A1 | 7/2025 | Agrawal |
| 2025/0259384 | A1 | 8/2025 | Wald |
| 2025/0299289 | A1 | 9/2025 | Stepuch et al. |
| 2025/0299420 | A1 | 9/2025 | Woop |
| 2025/0308030 | A1 | 10/2025 | Wald |
| 2025/0329073 | A1 | 10/2025 | Garcia et al. |
| 2025/0329077 | A1 | 10/2025 | Langtind et al. |
| 2025/0329111 | A1 | 10/2025 | Garcia et al. |

OTHER PUBLICATIONS

Non-final Office Action dated Oct. 27, 2025, U.S. Appl. No. 18/612,428, filed Mar. 21, 2024.
Response to Office Action dated Jan. 8, 2026, U.S. Appl. No. 18/612,428, filed Mar. 21, 2024.
Final Office Action dated Feb. 17, 2026, U.S. Appl. No. 18/612,428, filed Mar. 21, 2024.
DSA Array Implementation, Archive.org., [https://web.archive.org/web/20240131035904/https://www.w3schools.com/dsa/dsa_data_binarytrees_arraylmpl.php.
Fan, H.W., Pbrt, "Bounding vol. Hierarchies," HSWEIF, https://hsuanwei.me/2020/03/20/bvh/, Mar. 2020.
Non-final Office Action dated Oct. 16, 2025, U.S. Appl. No. 18/637,572, filed Apr. 17, 2024.
Combined Search and Examination Report under Sections 17 and 18(3) dated Oct. 22, 2025, GB Patent Application No.
English Abstract of Chinese Publication No. CN117726743 published Mar. 19, 2024.
Non-final Office Action dated Dec. 1, 2025, U.S. Appl. No. 18/637,568, filed Apr. 17, 2024.
Non-final Office Action dated Dec. 17, 2025, U.S. Appl. No. 18/637,563, filed Apr. 17, 2024.
Antochi et al., "Efficient Tile-Aware Bounding-Box Overlap Test for Tile-Based Rendering," International Symposium on System-on-Chip, Nov. 2004, 8 pages.
Hsiao et al., "A Hierarchical Primitive Lists Structure for Tile-based Rendering," 2009 International Conference on Computational Science and Enginerring, Aug. 2009, 6 pages.
Response to Office Action dated Jan. 14, 2026, U.S. Appl. No. 18/637,572, filed Apr. 17, 2024.
Final Office Action dated Jan. 27, 2026, U.S. Appl. No. 18/637,572, filed Apr. 17, 2024.
Response to Office Action dated Feb. 27, 2026, U.S. Appl. No. 18/637,568, filed Apr. 17, 2024.
Response to Office Action dated Mar. 16, 2026, U.S. Appl. No. 18/637,563, filed Apr. 17, 2024.
Final Office Action dated Apr. 9, 2026, U.S. Appl. No. 18/637,563, filed Apr. 17, 2024.
Combined Search and Examination Report under Sections 17 and 18(3) dated Apr. 11, 2024, GB Patent Application No. GB2316170.6, pp. 1-7.
Combined Search and Examination Report under Sections 17 and 18(3) dated Apr. 15, 2024, GB Patent Application No. GB2316172.2, pp. 1-8.
Response to Office Action dated Apr. 27, 2026, U.S. Appl. No. 18/637,572, filed Apr. 17, 2024.
Response to Office Action dated Jan. 26, 2026, U.S. Appl. No. 18/613,436, filed Mar. 22, 2024.
Non-final Office Action dated May 1, 2026, U.S. Appl. No. 18/918,872, filed Oct. 17, 2024.
Response to Office Action dated May 11, 2026, U.S. Appl. No. 18/612,428, filed Mar. 21, 2024. .
Non-final Office Action dated May 11, 2026, U.S. Appl. No. 18/918,880, filed Oct. 17, 2024.
Non-final Office Action dated May 19, 2026, U.S. Appl. No. 18/637,572, filed Apr. 17, 2024.
Response to Office Action dated Jul. 9, 2026, U.S. Appl. No. 18/637,563, filed Apr. 17, 2024.

* cited by examiner

STORING GRAPHICS PROCESSING PRIMITIVE INFORMATION

BACKGROUND

The technology described herein relates to computer graphics processing, and in particular to tile-based graphics processing.

Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles, quadrilaterals, points, lines, or groups thereof.

Each primitive is usually defined by and represented as a set of vertices (e.g. three vertices in the case of triangular primitive). Typically, the set of vertices to be used for a given graphics processing output (e.g. frame for display) will be stored as a set of vertex data defining the vertices, e.g. the relevant attributes for each of the vertices. These attributes will typically include position data and other, non-position data (varyings), e.g. defining colour, light, normal, texture coordinates, etc, for the vertex in question.

This geometry (vertex) data is processed by a graphics processor to generate the desired graphics processing output (render target), such as a frame for display. This typically comprises "assembling" primitives using the vertices, and then processing the so-assembled primitives.

The primitive processing may involve, for example, determining which sampling points of an array of sampling points associated with the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process typically determines the sample positions that should be used for a primitive (i.e. the (x, y) positions of the sample points to be used to represent the primitive in the output, e.g. frame to be displayed). The rendering process then derives (samples) the data, such as red, green and blue (RGB) colour values and an "Alpha" (transparency) value, necessary to represent the primitive at the sample points (i.e. "shades" each sample point). This can involve, for example, applying textures, blending sample point data values, etc.

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "tiles". The render output is typically divided (by area) into regularly-sized and shaped rendering tiles (they are usually e.g., squares or rectangles). The tiles are each rendered separately (e.g., one after another). The rendered tiles are then combined to provide the complete render output (e.g. frame for display).

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.

In a tile-based graphics processing pipeline, the primitives for the render output being generated may typically be sorted into primitive listing regions of the render output area, so as to allow the primitives that need to be processed for a given region (tile) of the render output to be identified. This sorting allows primitives that need to be processed for a given region (tile) of the render output to be identified so as to, e.g., avoid unnecessarily rendering primitives that are not actually present in a region (tile). The tiling process typically produces lists of (assembled) primitives to be rendered for different primitive listing regions of the render output, commonly referred to as "primitive lists" (or "tile lists").

The primitive lists generated by the tiling process are typically written out to memory. Once the primitive lists have been prepared for all the render output regions and written out, each rendering tile is processed, by reading the primitive list(s) for the rendering tile, and rasterising and rendering the primitives listed in the primitive list(s) for the rendering tile.

Thus, tile-based graphics processing typically comprises an initial, geometry ("tiling") processing pass in which primitives assembled from geometry data are sorted into primitive listing regions so as to generate primitive lists, and the generated primitive lists are written out to memory. In a subsequent "fragment processing" pass, the rendering tiles are each rendered separately, with the primitive lists being read from memory to determine which primitives to process (rasterise and render) for which rendering tiles.

An alternative tile-based graphics processing arrangement is described in United Kingdom Patent Application No. 2316170.6. In this process, the initial geometry processing pass involves building a hierarchy of bounding boxes representative of positions of primitives to be processed, and the subsequent fragment processing pass involves traversing the hierarchy of bounding boxes to identify which primitives to process (rasterise and render) for which rendering tiles.

The inventors believe there remains scope for improvements to tiling and tile-based graphics processors.

BRIEF DESCRIPTION OF THE DRAWINGS

Embodiments of the technology described herein will now be described by way of example only and with reference to the accompanying drawings, in which.

DETAILED DESCRIPTION

Figure 1:
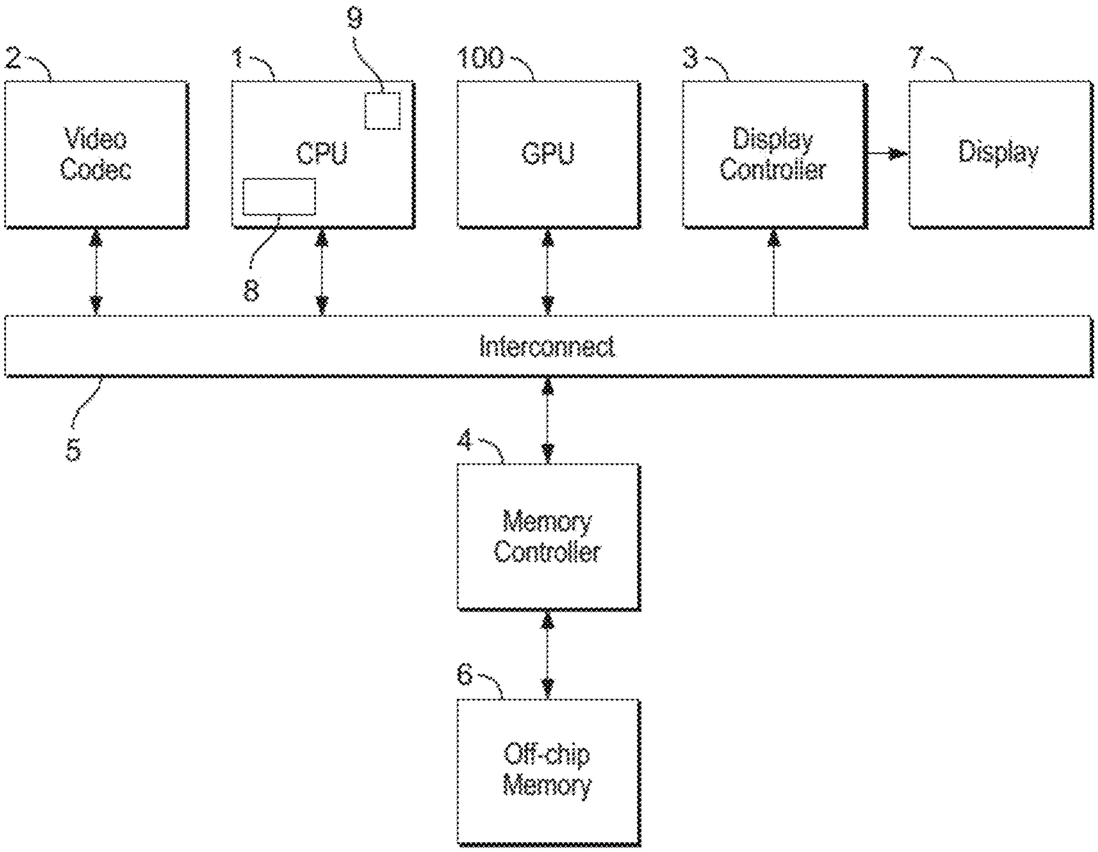
FIG. 1 shows an exemplary graphics processing system.

A first embodiment of the technology described herein comprises a method of operating a tile-based graphics processing system or graphics processor that is operable to generate a render output by generating and storing primitive information representative of positions of primitives to be processed to generate the render output, and reading and using the primitive information to identify primitives to process to generate a (each) rendering tile of the render output; the method comprising:

- generating primitive information for a set of primitives to be processed to generate a render output; and
- storing the primitive information in a set of linked blocks of memory space;
- wherein at least one block of memory space of the set of linked blocks of memory space (is a linking block that) comprises links to at least two other blocks of memory space of the set of linked blocks of memory space, and at least one block of memory space of the at least two other blocks of memory space (is a non-linking block that) does not comprise any links to other blocks of memory space of the set of linked blocks of memory space.

A second embodiment of the technology described herein comprises a tile-based graphics processing system or graphics processor that is operable to generate a render output by generating and storing primitive information representative of positions of primitives to be processed to generate the render output, and reading and using the primitive information to identify primitives to process to generate a (each) rendering tile of the render output; the graphics processing system comprising:

- a generating circuit configured to generate primitive information for a set of primitives to be processed to generate a render output; and
- a storing circuit configured to store primitive information generated by the generating circuit in a set of linked blocks of memory space;
- wherein at least one block of memory space of the set of linked blocks of memory space (is a linking block that) comprises links to at least two other blocks of memory space of the set of linked blocks of memory space, and at least one block of memory space of the at least two other blocks of memory space (is a non-linking block that) does not comprise any links to other blocks of memory space of the set of linked blocks of memory space.

The technology described herein relates to tile-based graphics processing. Thus, in embodiments, a (the) render output, e.g. frame (image) to be displayed, is generated by separately generating each rendering tile of plural rendering tiles that the render output is divided into, and combining the separately generated rendering tiles.

In embodiments of the technology described herein, in order to facilitate this, (at least) a first processing pass and a second processing pass are performed by the graphics processing system/processor. In embodiments, the first processing pass generates and stores primitive information that is used in the second processing pass to determine which primitives to process (e.g. rasterise and render) to generate a (each) particular rendering tile (and thus, in effect, which primitives do not need to be processed to generate a particular rendering tile).

As will be discussed in more detail below, this primitive information may represent lists of primitives to process for different primitive listing regions of the render output. Alternatively, the primitive information may represent (in embodiments, a hierarchy of) bounding boxes that are representative of positions of primitives to be processed. For example, the graphics processor/processing system may be arranged substantially as described in United Kingdom Patent Application No. 2316170.6, the entire contents of which is incorporated herein by reference.

The stored primitive information is, in embodiments, read from the set of linked blocks of memory space, and used to identify primitives to process (e.g. rasterised and render) to generate a (and in embodiments each) rendering tile.

Thus, another embodiment of the technology described herein comprises a method of operating a tile-based graphics processing system or graphics processor that is operable to generate a render output by generating and storing primitive information representative of positions of primitives to be processed to generate the render output, and reading and using the primitive information to identify primitives to process to generate a (each) rendering tile of the render output; the method comprising:

- generating a (each) rendering tile of a render output by:
- reading, from a set of linked blocks of memory space, primitive information for a set of primitives to be processed to generate a render output;
- using the primitive information to identify primitives to be processed to generate the (respective) rendering tile; and
- processing the identified primitives to generate the (respective) rendering tile;
- wherein at least one block of memory space of the set of linked blocks of memory space (is a linking block that) comprises links to at least two other blocks of memory space of the set of linked blocks of memory space, and at least one block of memory space of the at least two other blocks of memory space (is a non-linking block that) does not comprise any links to other blocks of memory space of the set of linked blocks of memory space.

Another embodiment of the technology described herein comprises a tile-based graphics processing system or graphics processor that is operable to generate a render output by generating and storing primitive information representative of positions of primitives to be processed to generate the render output, and reading and using the primitive information to identify primitives to process to generate a (each) rendering tile of the render output; the graphics processing system comprising:

a primitive providing circuit configured to:

read, from a set of linked blocks of memory space, primitive information for a set of primitives to be processed to generate a render output; and use the primitive information to identify primitives to process to generate a (each) rendering tile of a render output; and a rendering circuit configured to generate a (each) rendering tile of a render output by processing primitives identified by the primitive providing circuit;

wherein at least one block of memory space of the set of linked blocks of memory space (is a linking block that) comprises links to at least two other blocks of memory space of the set of linked blocks of memory space, and at least one block of memory space of the at least two other blocks of memory space (is a non-linking block that) does not comprise any links to other blocks of memory space of the set of linked blocks of memory space.

These embodiments can, and in embodiments do, include one or more, and in embodiments all, features of other embodiments of the technology described herein, as appropriate.

In embodiments of the technology described herein, rather than there being a single pool (heap) of contiguous memory addresses where primitive information that is used to generate a graphics output (e.g. frame for display) can be stored, the pool (heap) of memory space for storing primitive information is provided in the form of a collection of independent blocks of memory space which are linked together, e.g. and in embodiments, such that blocks of memory space within the set can be handled together as single entity.

This means that rather than having to set aside a single large set of contiguous memory addresses for storing primitive information for a graphics output (e.g. frame for display), plural smaller blocks of contiguous memory addresses that are, e.g., spread around in memory can be, and are, provided and linked in a single set to provide the memory space pool (heap) for storing primitive information for a graphics output (e.g. frame for display).

This can facilitate simpler and more flexible memory management. For example, and in embodiments, by adding blocks of memory space to the set of linked blocks of memory space, the size of the pool (heap) of memory space for storing primitive information for a graphics output (e.g. frame for display) can be increased in a straightforward manner. This means that the size of the overall pool (heap) of memory space can be dynamically adjusted in response to the actual amount of memory space that is being used for a graphics output (e.g. frame for display). Thus, the memory footprint for storing primitive information can be better tailored to the actual requirements of the graphics processing being performed. Embodiments of the technology described herein can accordingly reduce memory footprint of a graphics processing system that generates and uses primitive information.

The inventors have recognised that one way to manage such a set of linked memory space blocks would be to arrange the set as a linked list, with each block in the list (e.g. except the last one) comprising a respective link (e.g. pointer) to the next block in the list.

In embodiments of the technology described herein, in contrast, at least one block of memory space of a set of linked blocks of memory space is a "linking" block that comprises plural links (e.g. pointers) to plural other blocks in the set, and at least one other block of memory space in the set is a "non-linking" block that does not comprise any links (e.g. pointers) to other blocks in the set.

The inventors have recognised that this means that plural links can be read from a single linking block of memory space, and used to locate plural other blocks of memory space in the set, and that this can reduce latency, e.g. as compared to a more traditional linked list arrangement in which a block of memory space can typically only be located by reading and following each link (e.g. pointer) from each preceding block in the list in order. Embodiments of the technology described herein can accordingly improve the performance of a graphics processing system that generates and uses primitive (e.g. bounding box) information.

It will be appreciated therefore, that the technology described herein provides improved tile-based graphics processing.

The graphics processing system should, and in embodiments does, comprise a graphics processor (GPU) which is operable to generate a render output. The graphics processor may generate and/or store the primitive information, and/or may read and use the primitive information, and may thus comprise the generating circuit and/or storing circuit and/or primitive providing circuit and/or rendering circuit. The graphics processor should, and in embodiments does, generate an overall render output on a tile-by-tile basis. The render output (area) should thus be, and in embodiments is, divided into plural rendering tiles for rendering purposes.

The render output may comprise any suitable render output, such as frame for display, or render-to-texture output, etc. . . . The render output will typically comprise an array of data elements (sampling points) (e.g. pixels), for each of which appropriate render output data (e.g. a set of colour value data) is generated by the graphics processing system/processor (in the second processing pass). The render output data may comprise colour data, for example, a set of red, green and blue, RGB values and a transparency (alpha, a) value. Where the graphics processor generates plural (e.g. a series of) render outputs, each render output may be generated in accordance with the technology described herein.

The tiles that the render output is divided into for rendering purposes can be any suitable and desired such tiles. The size and shape of the rendering tiles may normally be dictated by the tile configuration that the graphics processing system/processor is configured to use and handle.

The rendering tiles are in embodiments all the same size and shape (i.e. regularly-sized and shaped tiles are in embodiments used), although this is not essential. The tiles are in embodiments rectangular, and in embodiments square. The size and number of tiles can be selected as desired. In embodiments, each tile is 16×16, 32×32, or 64×64 data elements (sampling positions) in size (with the render output then being divided into however many such tiles as are required for the render output size and shape that is being used).

The graphics processing system can include any (other) suitable and desired components. In embodiments, the graphics processing system includes a host processor which is operable to issue graphics processing commands (and data) to the graphics processor (GPU). The host processor can be any suitable and desired processor, such as and in embodiments a central processing unit (CPU), of the graphics processing system.

The graphics processing system should, and in embodiments does, (further) comprise a memory. The memory can be any suitable and desired storage. The memory may be an on-chip memory (i.e. on the same chip as the host processor and/or the graphics processor) or it may be an external (main) memory (i.e. not on the same chip as the host processor and/or the graphics processor).

The host processor and/or the graphics processor may be in direct communication with the memory, or may communicate with the memory via a cache system. Thus, in embodiments, the graphics processing system/processor comprises a cache system that is operable to cache data stored in the memory for the graphics processing system/processor.

In embodiments of the technology described herein, primitive information is stored in (and read from) a set of linked blocks of memory space that includes "linking" and "non-linking" blocks. A (each) linking block should, and in embodiments does, include memory space for storing plural links to plural other blocks in the set. In embodiments, a (each) linking block of memory space further comprises memory space for storing (at least) primitive data. In embodiments, a (each) linking block comprises a header for storing plural links, and payload for storing primitive data. In embodiments, a (each) non-linking block of memory space comprises memory space for storing (at least) primitive data, but does not comprise any memory space (e.g. a header) for storing links to other blocks in the set.

The memory space in a (each) block is, in embodiments, memory space in the (main) memory of the graphics processing system. Thus, there is, in embodiments, an allocated set of plural blocks of memory space that together form a memory space pool (a "heap") in the memory of the graphics processing system that is set aside for use for storing (at least) primitive information.

A (each) memory space block should, and in embodiments does, comprise a set of contiguous (virtual) memory addresses (in the e.g. virtual (logical) memory address space). In embodiments, virtual memory addresses for a memory space block are associated with a corresponding set of physical memory addresses, which set of (physical) memory addresses are also in embodiments contiguous, but need not be contiguous, memory addresses (in the physical memory address space). Thus, the set of linked blocks of memory space, in embodiments, comprises plural blocks of memory space, each block of memory space comprising a contiguous set of memory addresses.

A (each) memory space block can be any suitable and desired size (i.e. can comprise any suitable and desired number of memory addresses). Memory space blocks may have the same (fixed) size (encompassing the same range of memory addresses), or there may be memory space blocks having different sizes in the set. For example, linking blocks may all have the same (fixed) size, or may differ in size. Similarly, non-linking blocks may all have the same (fixed) size, or may differ in size.

Similarly, linking and non-linking blocks may be the same size, or may differ in size. As already mentioned, a (each) linking block should, and in embodiments does, have space to store links (e.g. pointers) to other blocks in the set, whereas a non-linking block should not, and in embodiments does not, have any space to store links to other blocks in the set. A (each) non-linking block may have the same or less memory space to store primitive information than a (each) linking block. In embodiments, a (each) non-linking block has more memory space to store primitive information than a (each) linking block, e.g. by a predetermined factor or amount. For example, and in embodiments, a (each) non-linking block of memory space may have twice as much space to store primitive information as a linking block. Other factors/amounts would be possible.

A (each) link can be provided as desired. In embodiments, a (each) link comprises a pointer which can point to (a memory address in) another memory space block to indicate a link to the another memory space block.

In embodiments, the memory space blocks within a (the) set are arranged and linked in a particular sequence, which, in embodiments represents the order in which the memory space blocks in the set will be (and are) used (e.g. written and read) by the graphics processing system/processor. Thus, in embodiments, blocks of memory space in the linked set are filled with primitive information in sequence order. Correspondingly, in embodiments, blocks of memory space in the set are read in sequence order.

The block sequence should be, and in embodiments is, indicated by links (e.g. pointers) that are stored in linking blocks of the set (but not in non-linking blocks of the set). In embodiments, a pointer points to another memory space block to indicate a next memory space block in a sequence, or does not point to another memory space block (e.g. is a "null") to indicate an end, e.g. the last, memory space block in a sequence.

Linking block links (e.g. pointers) can indicate a block sequence in any suitable manner. In embodiments, a (each) linking block comprises links to blocks that immediately follow the (respective) linking block in the overall block sequence. In embodiments, links within a (each) respective linking block are arranged (e.g. stored) in an order that indicates the order of the blocks that the links (e.g. pointers) link to (e.g. point to).

Thus, in embodiments, a (each) linking block comprises plural links (e.g. pointers) to plural other blocks (immediately) following the (respective) linking block in the overall block sequence of the set, wherein the plural links are arranged (stored) in a sequence that indicates the order of the plural other blocks.

In embodiments, a sequence of linked block (always) starts with a (first) linking block of memory space (that can comprise plural links to plural next blocks in the sequence). In embodiments, a (each) linking block is (immediately) followed by at least one non-linking block in the sequence (and comprises a link to the at least one non-linking block).

The set of linked blocks can include only one linking block, or plural linking blocks. Where there is only one linking block, the only one linking block should, and in embodiments does, comprise links (e.g. pointers) to all other blocks in the set, and in embodiments is the first block in the block sequence. Where there are plural linking blocks, in embodiments there is at least one non-linking block in the block sequence in between each pair of adjacent linking blocks in the sequence.

A (each) linking blocks can include any suitable number of plural links (e.g. pointers) to other blocks in the set. In embodiments, there is a maximum number of links (e.g. pointers) that a (each) linking block can comprise. Different linking blocks could have different maximum numbers of links, but in embodiments all linking blocks have the same maximum possible number of links to other blocks in the set. Thus, in embodiments, a (each) linking block can only comprise a predetermined maximum number of links to other blocks in the set. The predetermined maximum can be any suitable plural number, such as 2, 4, 8, or another number.

In embodiments, a (each) linking block can include only one link to another linking block, which in embodiments is the last block in the block sequence indicated by the links of the linking block. Thus, in embodiments, a (each) linking block can include one or more links (e.g. pointers) to one or more non-linking blocks, and (then) only one link (e.g. pointer) to another (e.g. the next) linking block.

Thus, in embodiments, a block sequence comprises a repeating pattern of a linking block followed by one or more non-linking blocks, then another linking block followed by one or more further non-linking blocks, and so on.

Thus, in embodiments, the set of linked blocks comprises: a first linking block that comprises links (e.g. pointers) to (a predetermined number of) one or more first non-linking blocks, and the one or more first non-linking blocks following the first linking block. The first linking block may further comprise a link (e.g. pointer) to a second linking block, and the set may further comprise the second linking block following the one or more first non-linking blocks. The second linking block may comprise links (e.g. pointers) to (the predetermined number of) one or more second non-linking blocks, and the set may further comprise the one or more second non-linking blocks following the second linking block. The second linking block may further comprise a link (e.g. pointer) to a third linking block, and the set may further comprise the third linking block following the one or more second non-linking blocks, and so on.

The set of linked blocks of memory space can comprise any suitable total number of linked memory space blocks. In embodiments, the number of memory space blocks in the set can change with time, e.g. and in embodiments, in response to a need for more memory space. In embodiments, the set initially includes fewer memory space blocks than is expected to be required for a (the) graphics output (frame), and one or more new memory space blocks are added to the set dynamically, as required. By initially providing a relatively small amount of memory space, and then increasing the available memory space (only) if additional memory proves to be required, the technology described herein can facilitate the more efficient use of memory for storing primitive information in tile-based rendering systems.

Thus, in embodiments, primitive information is stored in a last block of memory space in a sequence of memory space blocks, or if the last block of memory space is full, a memory space block is (e.g. newly set aside and then) added to the end of the sequence, and primitive information is stored in the newly added memory space block. In embodiments, each time a new block is added to the set, a link (e.g. pointer) to the new block is stored in the previous linking block in the set sequence.

Thus, in embodiments, (the storing circuit) storing primitive information comprises: storing primitive information in a first (linking) block of memory space of the set of linked blocks of memory space; and when the first (linking) block of memory space is full: adding a second (non-linking) block of memory space to the set of linked blocks of memory space, storing primitive information in the second (non-linking) block of memory space, and storing a link (e.g. pointer) to the second (non-linking) block of memory space in the first (linking) block of memory space; and when the second (non-linking) block of memory space is full: adding a third (linking or non-linking) block of memory space to the set of linked blocks of memory space, storing primitive information in the third block of memory space, and storing a link (e.g. pointer) to the third block of memory space in the first (linking) block of memory space (and so on).

Thus, another embodiment of the technology described herein comprises a method of operating a tile-based graphics processing system or graphics processor that is operable to generate a render output by generating and storing primitive information representative of positions of primitives to be processed to generate the render output, and reading and using the primitive information to identify primitives to process to generate a (each) rendering tile of the render output; the method comprising:

generating primitive information for a set of primitives to be processed to generate a render output; and storing the primitive information in a set of linked blocks of memory space;

wherein storing the primitive information comprises:

storing primitive information in a first (linking) block of memory space of the set of linked blocks of memory space; and when the first (linking) block of memory space is full: adding a second (non-linking) block of memory space to the set of linked blocks of memory space, storing primitive information in the second (non-linking) block of memory space, and storing a link to the second (non-linking) block of memory space in the first (linking) block of memory space; and when the second (non-linking) block of memory space is full: adding a third (linking or non-linking) block of memory space to the set of linked blocks of memory space, storing primitive information in the third block of memory space, and storing a link to the third block of memory space in the first (linking) block of memory space.

Another embodiment of the technology described herein comprises a tile-based graphics processing system or graphics processor that is operable to generate a render output by generating and storing primitive information representative of positions of primitives to be processed to generate the render output, and reading and using the primitive information to identify primitives to process to generate a (each) rendering tile of the render output; the graphics processing system comprising:

a generating circuit configured to generate primitive information for a set of primitives to be processed to generate a render output; and a storing circuit configured to store primitive information generated by the generating circuit in a set of linked blocks of memory space;

wherein the storing circuit is configured to store primitive information in a set of linked blocks of memory space by:

storing primitive information in a first (linking) block of memory space of the set of linked blocks of memory space; and when the first (linking) block of memory space is full: adding a second (non-linking) block of memory space to the set of linked blocks of memory space, storing primitive information in the second (non-linking) block of memory space, and storing a link to the second (non-linking) block of memory space in the first (linking) block of memory space; and when the second (non-linking) block of memory space is full: adding a third (linking or non-linking) block of memory space to the set of linked blocks of memory space, storing primitive information in the third block of memory space, and storing a link to the third block of memory space in the first (linking) block of memory space.

These embodiments can, and in embodiments do, include one or more, and in embodiments all, features of other embodiments of the technology described herein, as appropriate.

As mentioned above, the tile-based graphics processing system/processor may perform a first (geometry, e.g. tiling) processing pass and a second (e.g. fragment) processing pass in order to generate a (the) render output (e.g. frame for display). In embodiments, the first processing pass prepares primitive information (data) for a set of primitives that is used in the second processing pass to determine which primitives of the set to process (rasterise and render) for which rendering tiles that the render output is divided into.

The second processing pass can be, and in embodiments is, performed after the primitive information (data) has been generated and written out (stored) in the first processing pass. In embodiments, the second processing pass uses the (previously generated and stored) primitive information (data) generated in the first processing pass to, when rendering a (and in embodiments, each) tile of the render output, determine which primitives to process (rasterise and render) to generate the (respective) rendering tile, and processes (rasterises and renders) the determined primitives to generate the (respective) rendering tile of the render output.

In embodiments, the first (geometry/tiling) processing pass is "packetized", e.g. substantially as described in United Kingdom Patent Application No. 2217231.6, the entire context of which is incorporated herein by reference. Thus, embodiments comprise (in the first processing pass) a "frontend" process that generates packets (subsets) of one or more primitives, and a "backend" process that processes packets generated in the frontend process to generate and store primitive information for the packets.

A (each) packet should, and in embodiments does, store geometry data for the one or more primitives of the (respective) packet. For example, a packet may store appropriate attributes, such as positions and varyings, for a set of vertices for the primitives that the packet relates to. A packet may (further) store a set of identifiers (indices) for the vertices that can be used to determine how the vertices are used for the primitives that the packet relates to. A packet may (also) store attributes and identifiers for the primitives, and/or other, e.g., state, information relating to the primitives that the packet relates to. Other arrangements would be possible.

In embodiments, the frontend process allocates memory for storing primitive information that is to be generated in the backend process. Thus, in embodiments, memory space for storing primitive information for a packet of primitives is allocated from a block of memory space, the primitive information is generated, and then the primitive information is stored in the allocated memory space.

Packets of primitives can be generated in any suitable manner. In embodiments, primitives are assembled and assigned to packets in order (e.g. in which they are defined for processing). In embodiments, a packet has a fixed capacity, e.g. an upper limit of vertices and/or primitives, and when the fixed capacity is reached, a new packet is started. There may be an upper limit of vertices of, for example, 64, 128 or 256 vertices, and/or an upper limit of primitives of, for example, 64, 128 or 256 primitives. Other numbers would be possible.

In embodiments, once a packet is generated, geometry transformation operations for the primitives/vertices in the packet are triggered. The geometry transformation operations may comprise a position shading operation which transforms vertex position attributes from the model or user space that they are initially defined in, to the screen space that the render output is to be displayed in. The geometry transformation operations may also comprise transforming non-position vertex data (varyings) appropriately. In embodiments, once geometry transformation operations for a packet is completed, processing of the packet to generate and store primitive information for the packet is performed.

Thus, in embodiments, generating and storing primitive information comprises assigning (assembled) primitives to one or more packets of one or more primitives (e.g. in primitive processing order), and generating and storing primitive information for each packet of primitives.

In embodiments, for each packet of primitives, it is determined whether the set of linked blocks of memory space has insufficient memory space available to store primitive information for the respective packet of primitives; and when it is determined that the set of linked blocks of memory space has insufficient memory space available to store primitive information for the respective packet of primitives: a block of memory space is added to the set of linked blocks of memory space; and primitive information for the respective packet of primitives is stored in memory space of the block of memory space added to the set of linked blocks of memory space.

In embodiments, when it is not determined that the set of linked blocks of memory space has insufficient memory space available to store primitive information for a packet of primitives (when it is determined that the set of linked blocks of memory space has sufficient memory space available to store primitive information for the packet of primitives), primitive information for the packet of primitives is stored in memory space of one (e.g. the last) of the blocks of memory space that is already in the set of linked blocks of memory space.

The primitive information (generated in the first processing pass) can be any suitable data that can be used (in the second processing pass) to determine which primitives to process (e.g. rasterise and render) for which rendering tiles. In embodiments, the data comprises lists of primitives for different primitive listing regions of the render output. A render output primitive listing region for which a primitive list is prepared can be a single rendering tile, or a group of plural rendering tiles, etc. Thus, generating the primitive information (to be used in the second processing pass) may comprise preparing primitive lists.

Alternatively, a set of (plural) bounding boxes representative of positions of the set of primitives to be processed to generate the render output may be generated (in the first processing pass), and the primitive information may be representative of the set of (plural) bounding boxes. Thus, generating the primitive information may comprise generating bounding box information, e.g. as described in United Kingdom Patent Application No. 2316170.6.

Bounding box information can be any suitable data that is representative of bounding boxes that represent positions of primitives. In embodiments, a set of one or more bounding boxes that represent positions of primitives is generated (by the generating circuit), and information representative of the set of bounding boxes is stored (by the storing circuit).

A set of bounding boxes can be any suitable set of (plural) bounding boxes that represents primitive positions (e.g. in screen space), and that can be used (in the second processing pass) to determine which primitives to process (rasterise and render) for which rendering tiles. In embodiments, a (each) bounding box is a two-dimensional bounding box, e.g. a polygon such as a rectangle. In embodiments, a (each) bounding box is a two-dimensional bounding box defined in screen space (e.g. in x and y screen space dimensions). A set of bounding boxes may include one or more bounding boxes that each bound only one primitive, and/or one or more bounding boxes that each bound plural primitives. In embodiments, a (each) bounding box is determined from (and e.g. defined by) minimum and maximum (transformed) vertex positions (e.g. in x and y screen space dimensions) of the one or more primitives that the bounding box bounds. A (each) bounding box may be a minimum bounding box, or a less precise bounding box e.g. defined at the resolution of individual rendering tiles.

In embodiments, bounding box information is representative of a hierarchy of bounding boxes. Thus, in embodiments, a set of bounding boxes includes bounding boxes that correspond to different "levels" of a hierarchy. In embodiments, a (e.g. nested) hierarchy of bounding boxes is generated (by the generating circuit), that e.g. comprises a respective set of one or more bounding boxes for each "level" of plural levels of the hierarchy. In embodiments, a (each) primitive that a hierarchy of bounding boxes represents is bounded by plural different sized bounding boxes (at plural different "levels") of the hierarchy of bounding boxes.

In embodiments, a (each) higher-level bounding box bounds a (respective) subset of the set of bounding boxes at the next highest level of a hierarchy. A (each) higher-level bounding box may be, for example and in embodiments, e.g. a rectangle, determined from (and e.g. defined by) minimum and maximum positions of the lower-level bounding boxes which the higher-level bounding box bounds (e.g. in x and y screen space dimensions).

A (each) higher-level bounding box may bound any suitable number of bounding boxes of a set of bounding boxes at the next lowest level of a hierarchy, such as two, four, eight, or another number of, bounding boxes. Similarly, a hierarchy of bounding boxes may include any suitable number of hierarchy levels, such as two, four, eight, or another number of, levels.

Thus, embodiments comprise (in the first processing pass) (the generating circuit) building a hierarchy of bounding boxes, and (the storing circuit) storing bounding box information that is representative of the hierarchy of bounding boxes. Correspondingly, embodiments may comprise (in the second processing pass) traversing a hierarchy of bounding boxes to determine primitives to process (e.g. rasterise and render) to generate a (each) rendering tile.

A hierarchy of bounding boxes can be built in any suitable manner. In embodiments, for a (each) packet of primitives, at least a "packet bounding box" that bounds all of the primitives of the packet is generated. In embodiments, bounding boxes at a next (higher) hierarchy level are generated by combining packet bounding boxes. Bounding boxes at a next (higher) hierarchy level may be generated by combining higher-level bounding boxes, and so on. Thus, in embodiments, packets of primitives are generated (in the frontend process), and a hierarchy of bounding boxes is generated based on the packets of primitives (in the backend process).

Thus, in embodiments, building a hierarchy of bounding boxes comprises: generating, for each packet of primitives, a packet bounding box that bounds all of the one or more primitives of the respective packet; and generating, for each of one or more sets of plural packets, a respective higher-level bounding box that bounds all of the primitives of the plural packets of the respective set of plural packets (and so on).

In embodiments, a lowest level of the hierarchy of bounding boxes is represented by a set of primitive bounding boxes, wherein each primitive bounding box bounds a respective primitive. Thus, in embodiments, building a hierarchy of bounding boxes (further) comprises: generating, for each primitive of a packet of primitives, a primitive bounding box that bounds the respective primitive.

Bounding box information representative of a hierarchy of bounding boxes can be stored in the set of linked blocks of memory space in any suitable manner. In embodiments, a (each) block of memory space is configured to store bounding box information that defines (at least two different levels of) a respective bounding box hierarchy in a "self-contained" manner, and bounding box information that defines (at least two different levels of) a respective hierarchy of bounding boxes is stored in each respective block of memory space.

This can be achieved in any suitable and desired manner. In embodiments, a (each) memory space block is configured to store bounding box information representative of a hierarchy of bounding boxes generated for a predetermined number of packets of primitives, e.g. and in embodiments, a power-of-two number of packets of primitives, such as 256, 512, 1024 or 2048 packets, or another number of packets. For example, a (each) memory space block may be configured to store a predetermined number of packet bounding boxes, and as many higher-level bounding boxes as are required to define the hierarchy based on those packet bounding boxes. As mentioned above, different memory space blocks may have the same or different sizes, and thus may be able to store bounding box information for the same or different numbers of packets of primitives.

Thus, embodiments comprise (the storing circuit) storing in a first memory space block in the set of linked memory space blocks, bounding box information for a first predetermined number of packets of primitives for a render output; and when there are more than the first predetermined number of packets of primitives to store for the render output: adding a second memory space block to the set, and storing bounding box information for further packets of primitives in the second memory space block. In embodiments, bounding box information for a second predetermined number of packets of primitives is stored in the second memory space block; and when there are more packets of primitives to store for the render output, a third memory space block is added to the set and used to store bounding box information for further packets, and so on.

In embodiments, a (each) block of memory space comprises a respective memory space region for storing bounding box information for each "level" of (the) plural levels of the hierarchy. In embodiments, a (each) block of memory space is arranged as a set of lines, and a (each) memory space region comprises a respective sub-set of one or more lines. In embodiments, a (each) line comprise a set of one or more entries, wherein each entry can store information defining a respective bounding box (e.g. a minimum x value, a maximum x value, a minimum y value, and a maximum y value). In embodiments, a (each) line has a size equal to an integer number of cache-lines, such that a (each) block may be cache-line aligned.

Thus, a (each) block of memory space may comprise (at least): one or more lower-level lines (each) comprising one or more entries for storing one or more lower-level (e.g. packet) bounding boxes of a hierarchy, and one or more higher-level lines (each) comprising one or more entries for storing one or more higher-level bounding boxes of the hierarchy. A (each) block of memory space may further comprise one or more other lines (each) comprising one or more entries for storing one or more other level bounding boxes of the hierarchy.

In embodiments, a (each) linking block further comprises one or more (e.g. header) lines comprising entries for storing links (e.g. pointers) to other memory space blocks (and a (each) non-linking block does not comprise any such link-storing lines).

In embodiments, the arrangement is such that the relationship that a bounding box has with other bounding boxes in a hierarchy stored in a block is implicit from the line in which the bounding box is stored and the entry within the line that the bounding box is stored. In embodiments, a (each) bounding box stored in a higher-level line is implicitly related to (and bounds) all of the bounding boxes that are stored in a respective one of the next highest-level lines.

Thus, in embodiments, first information representative of a first bounding box of a first level of a hierarchy of bounding boxes is stored in, and/or read from, a first location in a block of memory space; and further information representative of one or more related bounding boxes of one or more further (higher and/or lower) levels of the hierarchy of bounding boxes are stored in, and/or read from, one or more further locations in the block of memory space; wherein the one or more further locations in the block of memory space are determinable from (and in embodiments determined from) the first location in the block of memory space.

In embodiments, bounding box information is stored in the set of linked memory space blocks so as to preserve an order in which packets were generated (in the frontend process). Thus, in embodiments, blocks of memory space are filled in an order corresponding to an order in which packets of primitives are generated. In embodiments, line/entries within a block are filled in an order corresponding to an order in which packets of primitives are generated.

In embodiments, for a (each) packet of primitives: a packet bounding box is generated that bounds all of the primitives of the respective packet; and the packet bounding box is stored in a block of memory space, in embodiments in a corresponding entry of a corresponding (lower-level) line. In embodiments, one or more related higher-level entries in the same block of memory space are updated appropriately, in embodiments by expanding the corresponding higher-level bounding box entries.

Expanding a higher-level bounding box may comprise determining whether a (each) maximum (e.g. x, y) position for a (the) lower-level (e.g. packet) bounding box is greater than the corresponding maximum position for the higher-level bounding box, and when it is determined that the maximum position for the lower-level bounding box is greater than the corresponding maximum position for the higher-level bounding box, using the maximum position for the lower-level bounding box as the new maximum position for the higher-level bounding box; and/or determining whether a (each) minimum (e.g. x, y) position for the lower-level bounding box is less than the corresponding minimum position for the higher-level bounding box, and when it is determined that the minimum position for the lower-level bounding box is less than the corresponding minimum position for the higher-level bounding box, using the minimum position for the lower-level bounding box as the new minimum position for the higher-level bounding box.

In embodiments, a lower-level (e.g. packet) bounding box is stored in the next available (line and/or entry) location in a block of memory space, and that (next available) location determines (implicitly) the (line and/or entry) location(s) in the memory space block of one or more related higher-level bounding boxes that are to be updated. Thus, embodiments comprise (the storing circuit): storing first information representative of a lower-level (e.g. packet) bounding box in a first (e.g. next available) (line and/or entry) location in a block of memory space; determining, based on (information indicating/knowledge relating to) the first location, one or more further (line and/or entry) locations in the block of memory space for storing further information representative of one or more higher-level bounding boxes that bound the lower-level (e.g. packet) bounding box, and updating the further information.

Primitive bounding boxes could be stored in the one or more blocks of memory space. However, in embodiments, primitive bounding boxes are stored separately, in embodiments in a corresponding packet. In embodiments, a (each) lowest-level entry of a memory space block stores a packet bounding box that bounds all of the primitives of a respective packet, and a link (e.g. pointer) that refers to (points to) (e.g. a packet comprising) data that defines the primitives of the packet and/or primitive bounding boxes for the primitives.

Thus, in embodiments, a (each) memory space block comprises bounding box information that (explicitly) defines at least two different levels of a hierarchy of bounding boxes, in embodiments including at least a highest level of the hierarchy and one or more lower levels of the hierarchy. A (each) memory space block may comprise bounding box information that (explicitly) defines all levels of a hierarchy of bounding boxes, i.e. including a highest level of the hierarchy and a lowest (e.g. primitive) level of the hierarchy (and one or more intermediate levels of the hierarchy). In embodiments, a (each) memory space block comprises bounding box information that (explicitly) defines all levels of a hierarchy of bounding boxes except one or more lowest (e.g. primitive) levels of the hierarchy, in embodiments with bounding box information that (explicitly) defines the one or more lowest (e.g. primitive) levels of the hierarchy being stored separately (e.g. in one or more corresponding packets).

Once primitive (e.g. bounding box) information has been stored in the set of linked memory space blocks (in the first processing processing), the set of linked memory space blocks may be read (in the second processing pass) and the primitive (e.g. bounding box) information used to determine which primitives to process for which rendering tiles.

To facilitate this, in embodiments, the graphics processing system/processor comprises a rendering circuit that is operable to process primitives to generate rendering tiles of the render output, and a primitive providing circuit that uses the primitive (e.g. bounding box) information (generated in the first processing pass) to determine primitives to process for a rendering tile, and provides the determined primitives to the rendering circuit for processing (in the second processing pass).

In embodiments, (in the second processing pass) the primitive providing circuit uses primitive (e.g. bounding box) information (generated in the first processing pass) to determine which primitives to process (rasterise and render) to generate a rendering tile and provides the determined primitives to the rendering circuit, and the rendering circuit processes (rasterises and renders) the primitives provided by the primitive providing circuit to generate the respective rendering tile.

The rendering circuit may include a rasteriser and a fragment renderer. In embodiments, the rasteriser receives primitives from the primitive providing circuit, rasterises the primitives to fragments, and provides the fragments to the fragment renderer for processing. In embodiments, the fragment renderer is operable to perform fragment rendering to generate rendered fragment data, and may perform any appropriate fragment processing operations in respect of fragments generated by the rasteriser, such as texture mapping, blending, shading, etc. . . .

In embodiments, the tile-based graphics processing system/processor comprises one or more tile buffers that store rendered data for a rendering tile being rendered by the tile-based graphics processing system/processor, until the tile-based graphics processing system/processor completes the rendering of the rendering tile. In embodiments, rendered fragment data generated by the fragment renderer is written to a tile buffer.

The tile buffer should be, and in embodiments is, provided local to (i.e. on the same chip as) a (the) tile-based graphics processor, for example, and in embodiments, as part of RAM that is located on (local to) the graphics processor (chip). The tile buffer may accordingly have a fixed storage capacity, for example corresponding to the data (e.g. for an array or arrays of sample values) that the tile-based graphics processor needs to store for (only) a single rendering tile until the rendering of that tile is completed.

Once a rendering tile is completed by the tile-based graphics processing system/processor, rendered data for the rendering tile in embodiments is written out from the tile buffer to other storage that is in embodiments external to (i.e. on a different chip to) the tile-based graphics processor, such as (a frame buffer in) the (main) memory, for use. The graphics processor in embodiments includes a write out circuit coupled to the tile buffer for this purpose.

In embodiments, in order to generate a rendering tile of the render output, each block of memory space in the set is read, e.g. in sequence order (by the primitive providing circuit), and the primitive information in each block is used to identify primitives to process to generate the rendering tile in question. In embodiments, primitives identified from all of the blocks of the set are processed (by the rendering circuit) to generate the rendering tile. This process may be repeated to generate each rendering tile of the render output, e.g. frame (image) for display. Rendering tiles of a render output may be generated one after the other, or at the same time, e.g. in parallel.

In embodiments, the primitive information comprises lists of primitives, and the primitives to process for a rendering tile may be identified (by the primitive providing circuit) by reading, from the set of linked blocks, one or more primitive lists that correspond to the rendering tile in question.

Alternatively, in embodiments (as discussed above), a (each) memory space block in the set stores bounding box information that defines (at least two different levels of) a respective hierarchy of bounding boxes for a render output. In these embodiments, for a (each) memory space block in the set, bounding box information that defines (at least two different levels of) a respective hierarchy of bounding boxes may be read from the respective block (by the primitive providing circuit), and the respective hierarchy of bounding boxes may be traversed (by the primitive providing circuit) to identify any primitives that should be processed to generate the rendering tile.

Thus, embodiments comprise generating a (each) rendering tile of a render output by, for each block of the set of linked blocks of memory space: reading, from the respective block of memory space, bounding box information that defines (at least two different levels of) a respective hierarchy of bounding boxes; traversing the respective hierarchy of bounding boxes to identify any primitives that should be processed to generate the rendering tile; and processing (rasterising and rendering) any identified primitives to generate the rendering tile.

In embodiments, traversing a hierarchy of bounding boxes (stored within a respective memory space block) to determine primitives to process to generate a rendering tile comprises determining whether the rendering tile overlaps a (and in embodiments, each) "highest-level" bounding box (at the highest level of the hierarchy). In embodiments, when it is determined that the rendering tile overlaps a highest-level bounding box, it is determined whether the rendering tile overlaps a (and in embodiments, each) "next highest-level" bounding box (at the next highest level of the hierarchy) that is bounded by the highest-level bounding box.

In embodiments, this traversal process is performed, as appropriate, for each level of a hierarchy, and thus may proceed, as appropriate, to the lowest (primitive) level of the hierarchy. Thus, in embodiments, when it is determined that the rendering tile overlaps a higher-level bounding box, it is determined whether the rendering tile overlaps a (and in embodiments, each) lower level bounding box that is bounded by the higher-level bounding box.

In embodiments, when it is determined that the rendering tile overlaps a primitive bounding box (at the lowest level of the hierarchy), it is determined that the primitive that is bounded by the primitive bounding box is a primitive to be processed to generate the rendering tile. The primitive may thus be provided to the rendering circuit for processing (e.g. rasterising and rendering).

In embodiments, when it is determined that a rendering tile does not overlap a bounding box (at any level of the hierarchy), it is determined that any primitive that is bounded by the bounding box is not a primitive to be processed to generate the rendering tile (i.e. does not need to be processed to generate the rendering tile).

Thus, in embodiments, traversing a hierarchy of bounding boxes comprises iteratively testing a rendering tile (area) against progressively smaller bounding boxes of the hierarchy of bounding boxes. In embodiments, traversing a hierarchy of bounding boxes to determine the primitives to process to generate a rendering tile comprises testing the rendering tile (area) against a larger (largest) bounding box of the hierarchy of bounding boxes to determine if the rendering tile (area) covers the larger (largest) bounding box (at least in part). If the rendering tile (area) does cover (at least in part) the larger (largest) bounding box, then the rendering tile (area) may be tested against a (each) smaller bounding box of the hierarchy of bounding boxes that the larger (largest) bounding box encompasses to determine if the rendering tile (area) covers the (respective) smaller bounding box (at least in part). This process may be repeated for a (each) bounding box encompassed by a bounding box found to be at least partially covered by the rendering tile (area), until a smallest bounding box size is reached. If the rendering tile (area) is found to cover (at least in part) a smallest bounding box, then it may be determined that any primitive bounded by the smallest bounding box is a primitive to be processed to generate the rendering tile.

In embodiments, the second processing pass thus comprises (the primitive providing circuit) determining that a primitive is a primitive to be processed (rasterised and rendered) to generate a rendering tile using plural different sized bounding boxes (at plural different levels) of the hierarchy of bounding boxes that bound that (same) primitive.

In embodiments, if it is found at any level of a hierarchy stored within a respective memory space block, that a rendering tile does not overlap any bounding boxes at that level, then it may be determined that there are no primitives to be processed for that respective memory space block.

In embodiments, a rendering tile is tested against each "highest-level" bounding box in a block of memory space in the order in which "highest-level" bounding boxes are stored in the block of memory space. In embodiments, a next highest-level bounding box is read from a next (line and/or entry) location in the block of memory space, and that (next) location determines (implicitly) the (line and/or entry) location(s) in the memory space block of one or more related lower-level bounding boxes that may need to be tested (depending on the testing of the highest-level bounding box).

Thus, embodiments comprise (the primitive providing circuit): reading first information representative of a highest-level bounding box from a first (e.g. next) (line and/or entry) location in a block of memory space; (determining whether a rendering tile overlaps the highest-level bounding box; and when it is determined that the rendering tile overlaps the highest-level bounding box:) determining, based on (information indicating/knowledge relating to) the first location, one or more further (line and/or entry) locations in the block of memory space that store further information representative of one or more lower-level bounding boxes that the highest-level bounding box bounds; and reading the further information (and using the read information to determine whether the rendering tile overlaps the one or more lower-level bounding boxes).

In embodiments, once all primitives to be processed for a rendering tile have been identified for a memory space block (or once it has been determined that there are no primitives to process for a memory space block), the process of identifying primitives to process for the rendering tile may (attempt to) move on to a next memory space block in the set, and a hierarchy of bounding boxes stored within the next memory space block may be traversed in a corresponding manner (and so on).

In embodiments, a next memory space block in a set is located using a link (e.g. pointer) to the next block, that is in embodiments stored in (e.g. in a header of) the preceding linking memory space block in the set sequence. Thus, embodiments comprise identifying any primitives to process for a memory space block, using a next link (e.g. pointer) stored in a linking memory space block to locate a next memory space block, and identifying any primitives to process for the next memory space block (and so on).

In embodiments, if a link (e.g. pointer) stored in a linking memory space block does not link to (e.g. point to) another block (e.g. is null), it may be determined that there are no more memory space blocks for the current render output. In this case, the next rendering tile or render output may be processed, as appropriate.

In embodiments, plural links (e.g. pointers) in a linking block are read together (e.g. in parallel). In embodiments, plural links read from the same linking block are used to locate plural other blocks of memory space. In embodiments, the plural other blocks of memory space may then be read and used to identify primitives to process at the same time (e.g. in parallel).

The technology described herein can be implemented in any suitable system, such as a suitably configured microprocessor based system. In embodiments, the technology described herein is implemented in a computer and/or micro-processor based system. The technology described herein is in embodiments implemented in a portable device, such as, and in embodiments, a mobile phone or tablet.

The technology described herein is applicable to any suitable form or configuration of graphics processor and graphics processing system, such as graphics processors (and systems) having a "pipelined" arrangement (in which case the graphics processor executes a rendering pipeline).

In embodiments, the various functions of the technology described herein are carried out on a single data processing platform that generates and outputs data, for example for a display device.

As will be appreciated by those skilled in the art, the graphics processing system may include, e.g., and in embodiments, a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in embodiments does, also execute a driver for the processor and optionally a compiler or compilers for compiling (e.g. shader) programs to be executed by (e.g. an (programmable) processing unit of) the processor.

The processor may also comprise, and/or be in communication with, one or more memories and/or memory devices that store the data described herein, and/or store software (e.g. (shader) program) for performing the processes described herein. The processor may also be in communication with a host microprocessor, and/or with a display for displaying images based on data generated by the processor.

The technology described herein can be used for all forms of input and/or output that a graphics processor may use or generate. For example, the graphics processor may execute a graphics processing pipeline that generates frames for display, render-to-texture outputs, etc. . . . The output data values from the processing are in embodiments exported to external, e.g. main, memory, for storage and use, such as to a frame buffer for a display.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

Furthermore, any one or more or all of the processing stages of the technology described herein may be embodied as processing stage circuitry/circuits, e.g., in the form of one or more fixed-function units (hardware) (processing circuitry/circuits), and/or in the form of programmable processing circuitry/circuits that can be programmed to perform the desired operation. Equally, any one or more of the processing stages and processing stage circuitry/circuits of the technology described herein may be provided as a separate circuit element to any one or more of the other processing stages or processing stage circuitry/circuits, and/or any one or more or all of the processing stages and processing stage circuitry/circuits may be at least partially formed of shared processing circuitry/circuits.

Subject to any hardware necessary to carry out the specific functions discussed above, the components of the data processing system can otherwise include any one or more or all of the usual functional units, etc., that such components include.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc. . . .

The technology described herein also extends to a computer software carrier comprising such software which when used to operate a data processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

FIG. 1 shows an exemplary graphics processing system in which the embodiments of technology described herein may be implemented.

The exemplary graphics processing system shown in FIG. 1 comprises a host processor comprising at least one central processing unit (CPU) 1, a graphics processor (graphics processing unit (GPU)) 100, a video codec 2, a display controller 3, and a memory controller 4. As shown in FIG. 1, these units communicate via an interconnect 5 and have access to an off-chip memory system (memory) 6. In this system, the graphics processor 100, the video codec 2 and/or CPU 1 will generate frames (images) to be displayed and the display controller 3 will then provide frames to a display 7 for display.

In use of this system, an application 8, such as a game, executing on the host processor (CPU) 1 will, for example, require the display of frames on the display 7. To do this the application 8 will send appropriate commands and data to a driver 9 for the graphics processor 100 that is executing on the at least one CPU 1. The driver 9 will then generate appropriate commands and data to cause the graphics processor 100 to render appropriate frames for display and store those frames in appropriate frame buffers, e.g. in main memory 6. The display controller 3 will then read those frames into a buffer for the display from where they are then read out and displayed on the display panel of the display 7.

Figure 2:
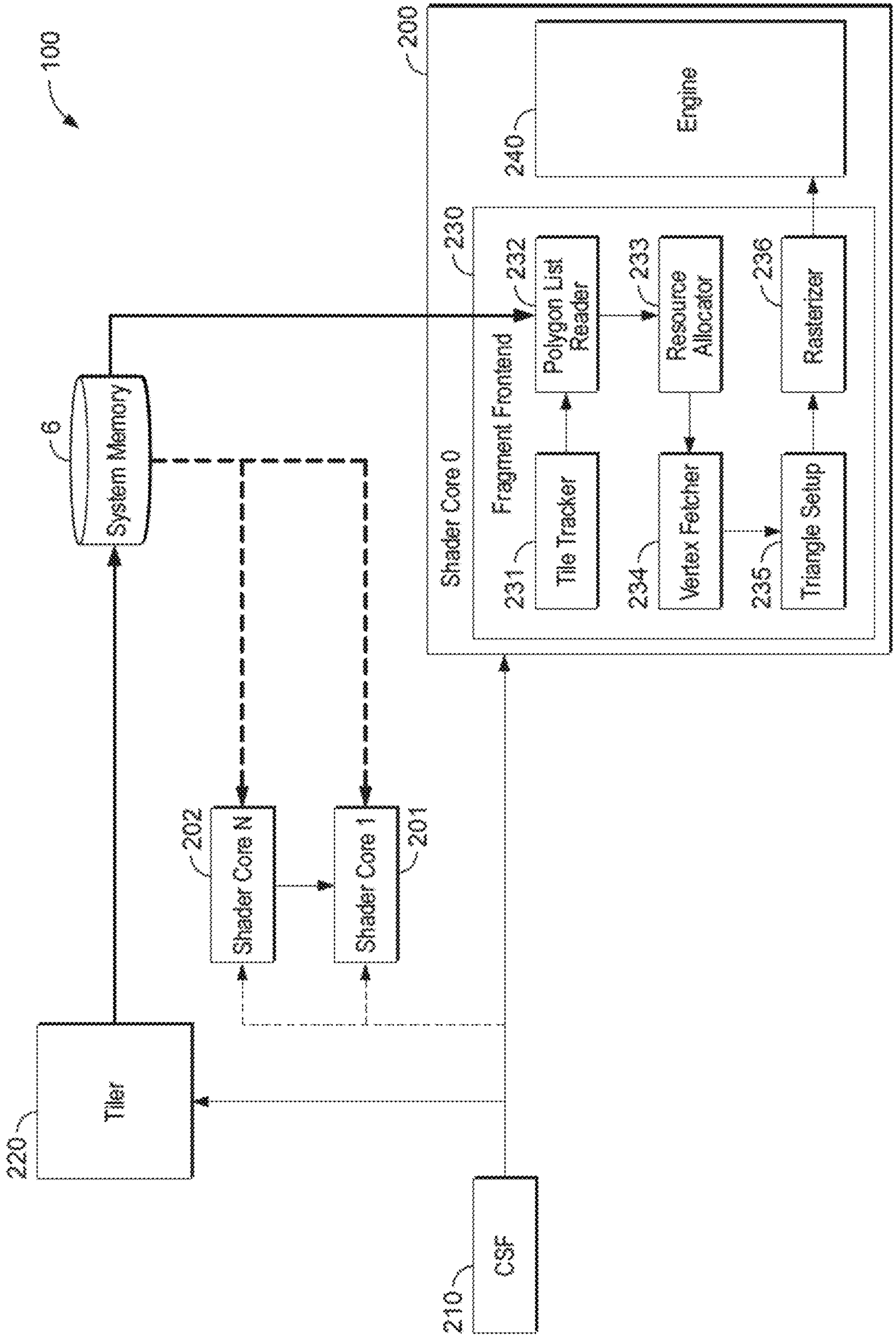
FIG. 2 shows an exemplary tile-based graphics processor.

FIG. 2 shows a typical tile-based graphics processor 100 in more detail. As shown in FIG. 2, the tile-based graphics processor 100 includes a command stream frontend (CSF) 210, a tiler (geometry processing control unit) 220, and a set of shader cores 200, 201, 202. FIG. 2 illustrates one of the shader cores 200 in greater detail than the others 201, 202, but each shader core of the graphics processor 100 has substantially the same configuration.

The command stream frontend 210 receives commands and data from the driver 9 (directly, or via data structures in memory), and distributes subtasks for execution to the tiling unit 220 and to the shader cores 200, 201, 202 appropriately.

In a tile-based rendering system the render output (e.g. frame for display) is divided into a plurality of tiles for rendering. Typically, each tile is 16×16, 32×32, or 64×64 data elements (sampling positions) in size, with the render output being divided into however many such tiles as are required for the render output size and shape that is being used. The tiles are rendered separately to generate the render output. To do this, for each draw call that is received to be processed, the tile-based graphics processor 100 operates to sort the primitives (polygons) for the draw call according to which tiles they should be processed for.

In order to facilitate this, in a typical tile-based graphics processor, the tiling unit 220 is operable to perform a first processing pass in which lists of primitives to be processed for different regions of the render output are prepared. These "primitive lists" (which can also be referred to as "tile lists" or "polygon lists") identify the primitives to be processed for the region in question.

As part of this processing pass, the tiler 220 and/or command stream frontend (CSF) 210 may assemble primitives from vertex data, and request vertex processing tasks to be performed by the set of shader cores 200, 201, 202 to generate processed (transformed) vertex data that the tiling unit 220 uses to prepare primitive lists. This "vertex shading" operation may comprise, for example, transforming vertex position attributes from the model space that they are initially defined for to the screen space that the output of the graphics processing is to be displayed in.

Once vertex processing and tiling has been completed, the transformed geometry and the primitive lists are written back to the main memory 6, and the first processing pass is complete.

A second processing pass is then performed for the render output, wherein each of the rendering tiles is rendered separately. In this processing pass, the fragment frontend 230 of a shader core 200 receives fragment processing tasks from the command stream frontend (CSF) 210, and in response, tile tracker 231 schedules the rendering work that the shader core needs to perform in order to generate a tile. Primitive list reader 232 then reads the appropriate primitive list(s) for that tile from the memory 6 to identify the primitives that are to be rendered for the tile.

Resource allocator 233 then configures various elements of the graphics processor 100 for rendering the primitives that the primitive list reader 232 has identified are to be rendered for the tile. For example, the resource allocator 233 may appropriately configure a local tile buffer for storing output data for the tile being rendered.

Vertex fetcher 234 then reads the appropriate processed (transformed) vertex data for primitives to be rendered from the memory 6, and provides the primitives (i.e. their processed vertex data) to triangle set-up unit 235. The triangle set-up unit 235 performs primitive setup operations to setup the primitives to be rendered. This includes determining, from the vertices for the primitives, edge information representing the primitive edges. The edge information for the primitives is then passed to the rasteriser 236.

When the rasteriser 236 receives a graphics primitive for rendering (i.e. including its edge information), it rasterises the primitive to sampling points and generates one or more graphics fragments having appropriate positions (representing appropriate sampling positions) for rendering the primitive.

Fragments generated by the rasteriser 236 may then be subject to "culling" operations, such as depth testing, to see if any fragments can be discarded (culled) at this stage. Execution threads are then issued to execution engine 240 for processing fragments that have survived the culling stage.

The execution engine 240 executes a shader program for each execution thread issued to it to generate appropriate render output data, including colour (red, green and blue, RGB) and transparency (alpha, a) data. The execution engine 240 may perform fragment processing (rendering) operations such as texture mapping, blending, shading, etc. on the fragments. Output data generated by the execution engine 240 is then written appropriately to the tile buffer.

Once a tile has been processed, its data is exported from the tile buffer to the main memory 6 (e.g. to a frame buffer in the main memory 6) for storage, and the next tile is then processed, and so on, until sufficient tiles have been processed to generate the entire render output (e.g. frame (image) to be displayed). The next render output (e.g. frame) may then be generated, and so on.

Figure 3:
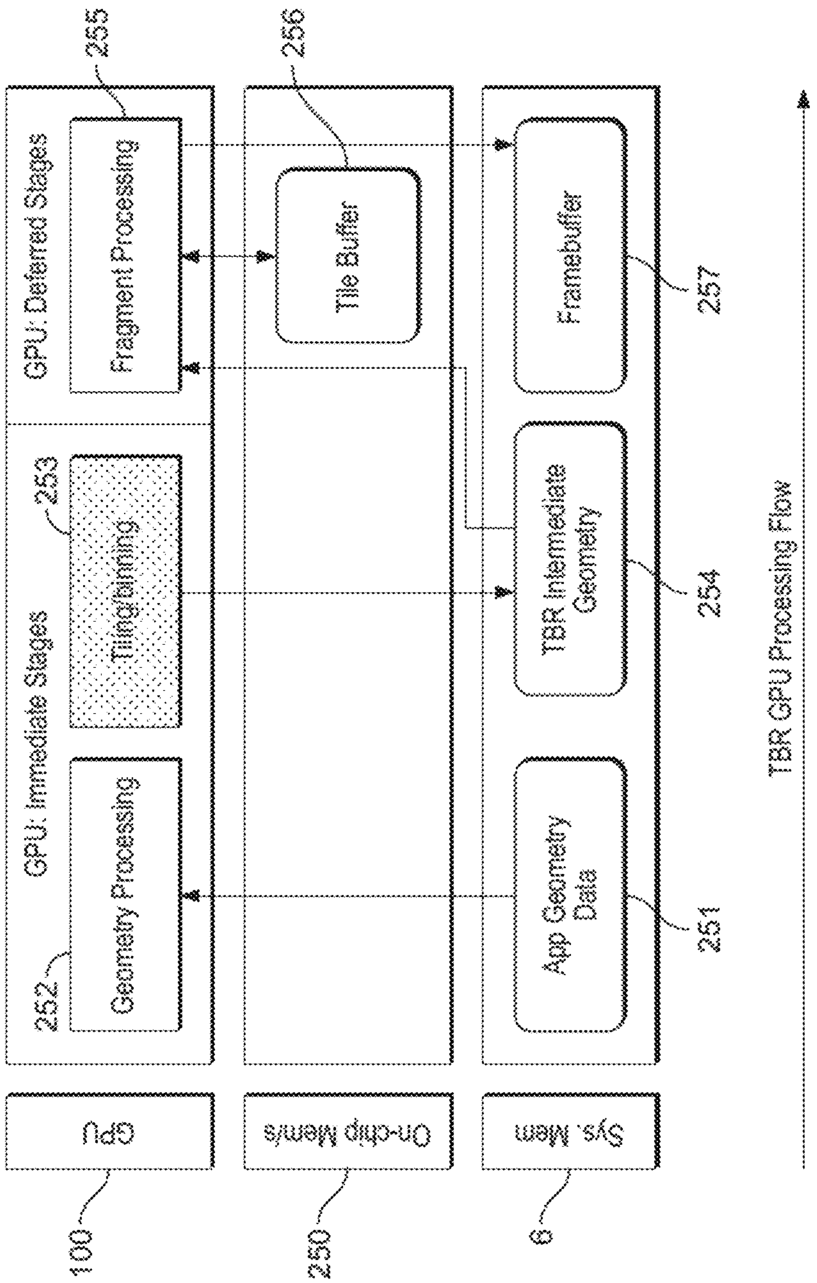
FIG. 3 shows an exemplary tile-based graphics processing pipeline according to embodiments.

FIG. 3 shows schematically the typical tile-based rendering process. As shown in FIG. 3, in the first processing pass, the required geometry data 251 for a draw call is read from the external memory system 6 into the graphics processor 100. The primitive vertices are thus obtained and the geometry processing 252 (vertex shading) is performed in order to generate a corresponding set of post-transformed geometry data (e.g. transformed vertices) 254.

The transformed geometry is subject to a tiling operation 253 by the tiling unit 220 of the graphics processor 100, wherein it is determined for each of the primitives which rendering tiles the primitives should be processed for. The tiling unit may also operate to cull primitives that are outside of the view frustrum, or are back facing. In this way, respective primitive lists are generated that indicate which primitives are to be rendered for which of the rendering tiles.

Once all of the geometry processing for the render output has completed, and the tiling operating has completed, the transformed geometry 254 is written back to the external memory system 6 together with the primitive lists, and the first processing pass is complete.

The second processing pass is then performed wherein each of the rendering tiles is rendered (separately) in turn. Thus, for each rendering tile, it is determined from the respective primitive list(s) which primitives should be processed for that tile, and the associated transformed geometry data 254 for those primitives is read back in from memory 6 and subject to fragment processing 255 to generate the render output.

As shown in FIG. 3, the rendering is performed using a tile buffer 256 that resides in on-chip memory 250. Thus, the rendering of a given tile is performed locally to the graphics processor 100. Once the rendering for the tile has complete, the rendered data is then written out to the external memory 6, e.g. into a frame buffer 257, e.g. for display.

It has been recognised that in tile-based graphics processing arrangements such as described above, the primitive lists must typically be generated and written out in serial order, e.g. so as to preserve the order in which the primitives are intended to be processed. This means that the primitive list writing process must typically operate in a serial fashion. This can create a performance "bottleneck" in the graphics processing pipeline, and can also hinder scaling to different tiling performance levels.

United Kingdom Patent Application No. 2316170.6 describes tile-based graphics processing in which bounding box information is written out in the first processing pass, and then in the second processing pass, the bounding box information is used to determine which primitives to process (rasterise and render) for which rendering tiles. As bounding box generation and writing out processes can be parallelised in a straightforward manner, this can facilitate improved performance, as well as scaling to different performance levels.

Figure 4:
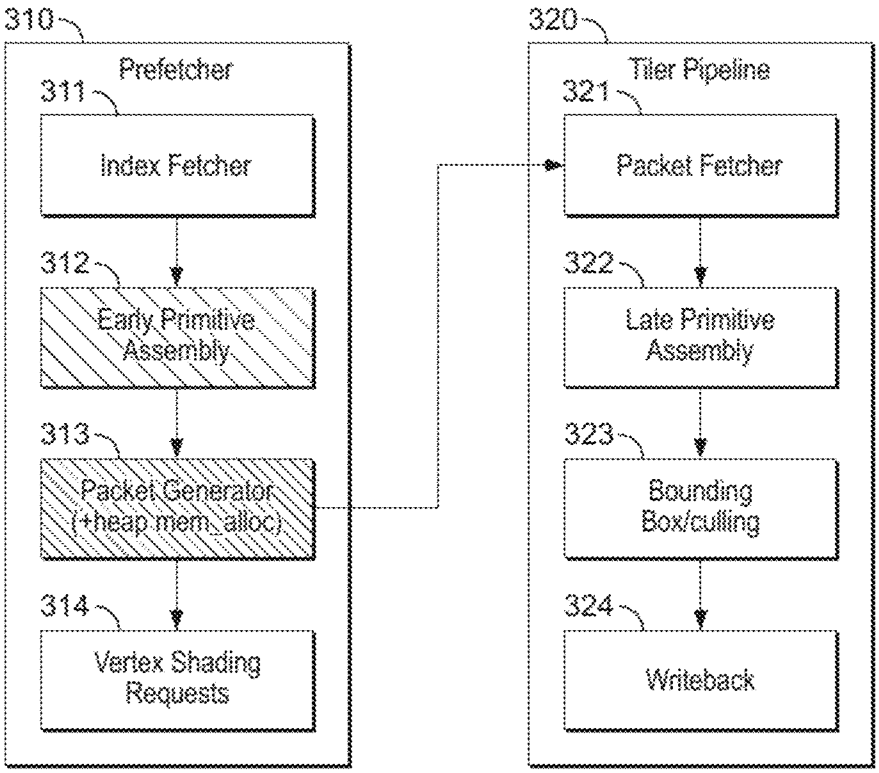
FIG. 4 shows a tile-based graphics processing pipeline according to embodiments.

FIG. 4 schematically illustrates a first processing pass that generates and writes out bounding box information in accordance with embodiments of the technology described herein. This process may be performed by a tiling unit (geometry processing control unit) 220 of the graphics processor 100 in a pipelined manner. As shown in FIG. 4, the pipeline includes a prefetcher pipeline 310 ("frontend") that generates "packets" and triggers vertex shading operations in respect of generated packets, and a tiler pipeline 320 ("backend") that processes the packets generated by the prefetcher pipeline 310.

The prefetcher pipeline 310 includes index fetcher 311 which fetches and outputs a sequence (stream) of indices from a stored vertex index array defined and provided for the render output being generated, and provides the sequence of indices to early primitive assembly stage 312. Early primitive assembly stage 312 assembles complete primitives from the stream of indices in accordance with primitive configuration information that defines the type of primitives to be assembled (e.g. whether the assembled primitives are to be in the form of triangles, triangle strips, triangle fans, points or lines, etc.), and outputs a sequence of complete assembled primitives to packet generation stage 313.

The packet generation stage 313 operates to generate packets comprising vertices of assembled primitives. The packet generation stage 313 allocates vertices and primitives that are received from the earlier primitive assembly 312 to a respective packet(s) in turn. The packet generation stage 313 also allocates appropriate space in memory 6 for storing the packets. The packet generation stage 313 may furthermore maintain a packet array to keep track of the packets it has generated and the order in which packets have been generated (for a particular drawcall/render output).

Figure 5:
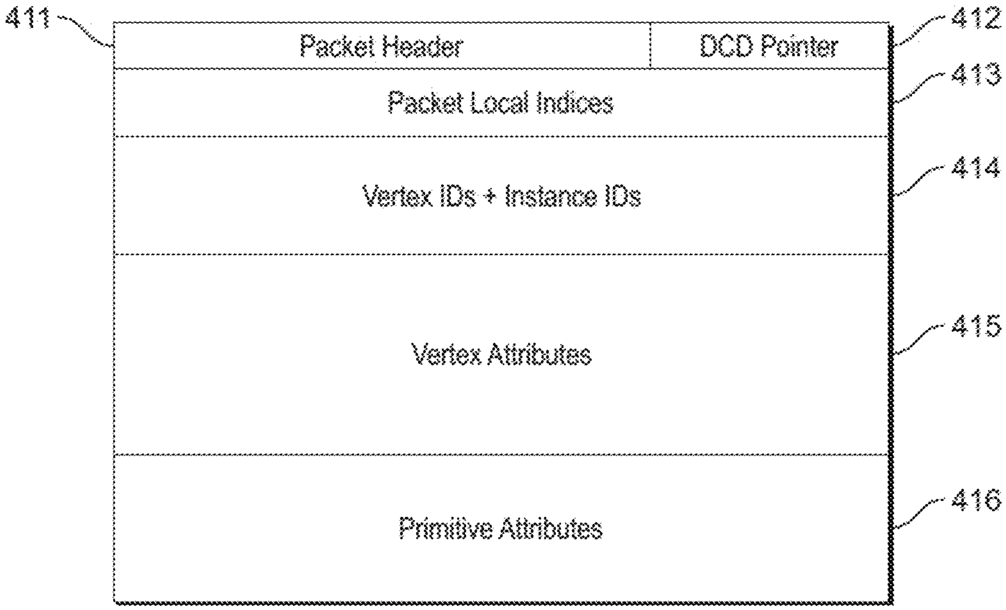
FIG. 5 shows an exemplary processing packet according to embodiments.

FIG. 5 illustrates a memory layout for a packet that may be allocated by the packet generation stage 313, in accordance with embodiments. As illustrated in FIG. 5, in the present embodiment, a packet includes header information 411 that includes a pointer to the draw call descriptor (DCD) 412 for the draw call that the packet represents. The packet further includes body information comprising identifiers 414 for the vertices that the packet contains, and indices 413 that reference the vertices to define the primitives that the packet contains. The packet further includes vertex attribute data 415 for the vertices that the packet contains, and primitive attribute data 416 for the primitives that the packet contains.

In the present embodiment, each packet has a maximum permitted number of vertices, e.g. 64, 128 or 256 vertices, and a maximum permitted number of primitives, e.g. 64, 128 or 256 primitives. A new packet is started once the maximum permitted number of vertices or the maximum permitted number of primitives is reached. Primitives are thus assigned to packets in the order in which the primitives are defined for processing (e.g. by driver 9). Each time a new packet is started, the packet generation stage 313 may allocate the next entry in the packet array, such that the order in which packets appear in the packet array corresponds to the order in which the packets were generated (and the order in which primitives appear in a packet corresponds to the order in which the primitives were specified for processing).

Returning to FIG. 4, once a packet has been filled up, vertex shading of position attributes for the vertices that have been included in the vertex packet is requested 314. In response to the vertex shading requests 314, the position shading for a packet is performed by the shader cores 200 executing an appropriate shader program, which generates and stores the vertex shaded (transformed) positions 415 for the vertices of the packet in the packet. Then, once the transformed vertex positions for the vertices of the packet have been generated and stored, they can then be processed by the tiler pipeline 320 ("backend").

With reference to FIG. 4, packet fetcher 321 of the tiler pipeline 320 ("backend") loads packets (when they are ready) from memory 6 into a vertex buffer. Late primitive assembly stage 322 may associate each assembled primitive in sequence with the corresponding transformed positions for the vertices for the primitive in question from the vertex buffer, and store appropriate primitive attribute information 416 in the packet.

As shown in FIG. 4, bounding box generation stage 323 then generates appropriate bounding boxes for the assembled primitives of a packet, and also operates to cull primitives from further processing on the basis of their (potential) visibility. This culling may comprise, for example, front/back-face culling, frustum culling, and/or sample aware culling, etc.

The bounding box generation uses the provided positions for the assembled primitives to generate an appropriate, e.g. minimum, bounding box for each primitive defined by a packet. In the present embodiment, these "primitive bounding boxes" are stored with the primitive attribute information 416 in the packet. Alternatively, the primitive bounding boxes could be stored in a dedicated region of the packet.

In the present embodiment, the bounding box generation stage 323 also generates for each packet, a "packet bounding box" that bounds all of the primitive bounding boxes within the packet. A packet bounding box may, for example, be generated by determining the maximum and minimum x and y values for the primitive bounding boxes within the packet in question.

Thus, in effect, a "hierarchy" of bounding boxes is generated: a "lowest" hierarchy level comprising a primitive bounding box for each primitive, and a "higher" hierarchy level comprising a packet bounding box for each packet.

In the present embodiment, a higher bounding box hierarchy level is generated by grouping packets into groups of packets, and generating a higher-level bounding box for each group of packets that bounds all of the packet bounding boxes for the group. One or more further higher levels of the bounding box hierarchy may be generated in an analogous manner, e.g. by grouping groups of packets and generating bounding boxes for groups of groups of packets, etc.

Once the bounding boxes have been generated, they may be written out 324 to memory 6. The bounding box information may be optionally compressed before being written out.

Figure 6:
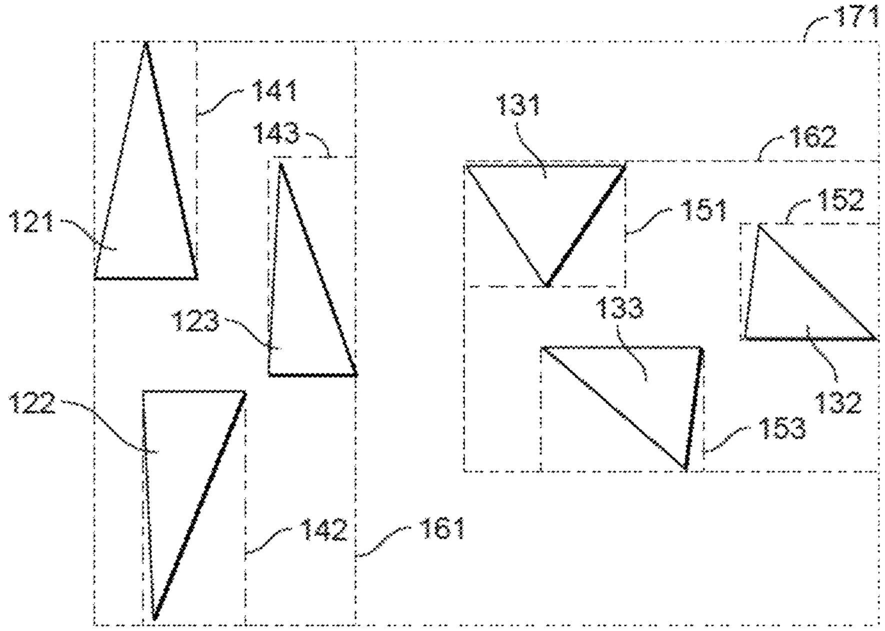
FIG. 6 shows a hierarchy of bounding boxes in accordance with embodiments.

FIG. 6 illustrates an exemplary set of primitives defined for a render output, together with a corresponding hierarchy of bounding box, according to embodiments. It will be appreciated that FIG. 6 is simplified for illustrative purposes, and in practice there may be many more primitives and bounding boxes defined for a render output.

FIG. 6 shows a first set of primitives 121, 122, 123 that are included in a first packet generated by tiler frontend 310, and a second set of primitives 131, 132, 133 that are included in a second packet generated by tiler frontend 310. As illustrated in FIG. 6, a respective primitive bounding box 141, 142, 143, 151, 152, 153 is drawn (in screen space) around each primitive. Furthermore, a respective packet bounding box 161, 162 is drawn (in screen space) around the primitive bounding boxes for each packet. FIG. 6 furthermore illustrates a next higher-level bounding box 171 that is drawn (in screen space) around the packet bounding boxes 161, 162 for the first and second packets.

It will be appreciated that in this embodiment, each bounding box is an axis-aligned minimum bounding box, but other arrangements would be possible. For example, less precise bounding boxes, such as bounding boxes at the resolution of individual rendering tiles, may be used.

Figure 7A:
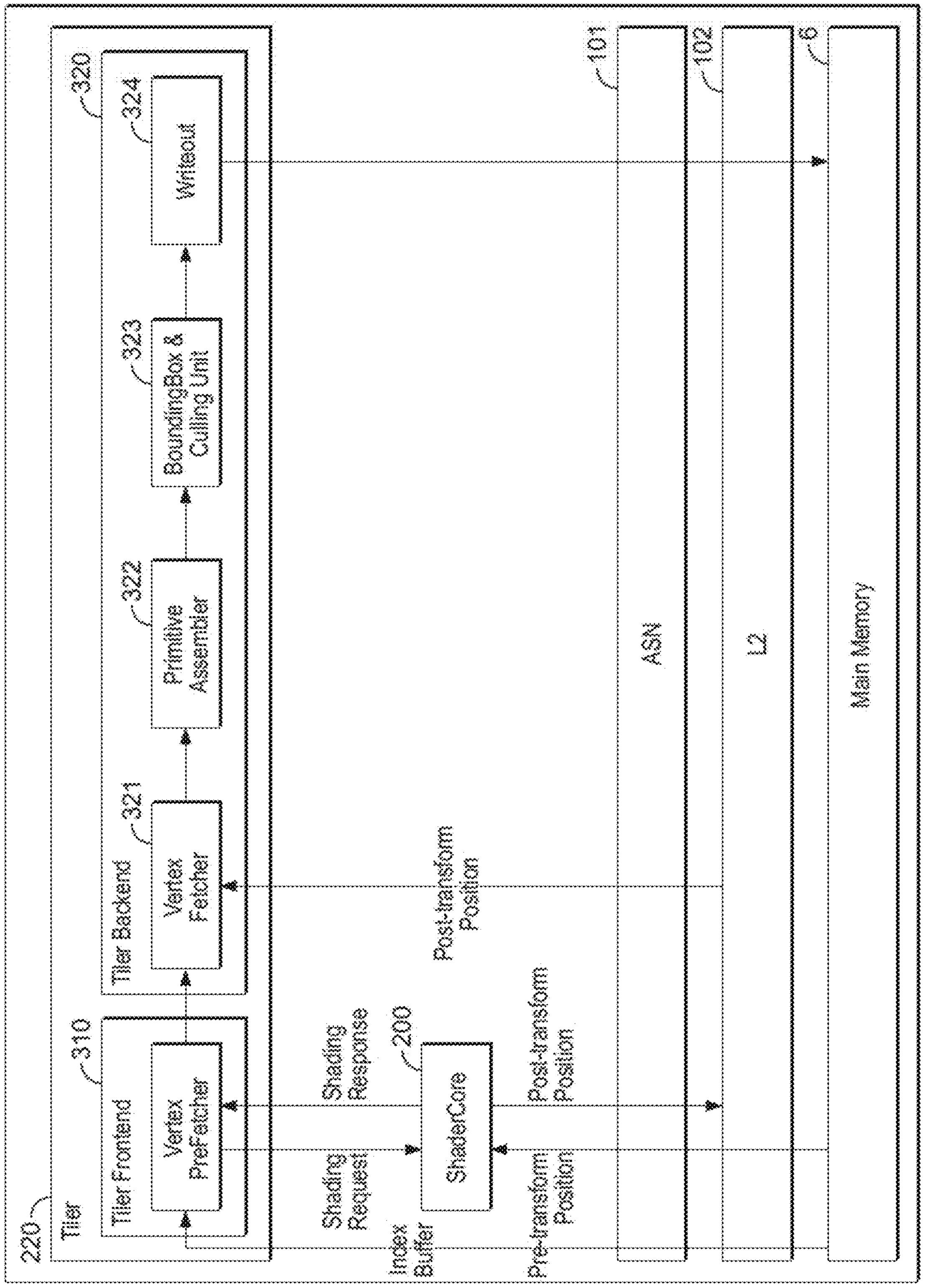
FIG. 7A shows a tile-based graphics processing pipeline according to embodiments.

FIG. 7A shows schematically an overview of the geometry (tiling) process of the present embodiment. As illustrated in FIG. 7A, tiler frontend 310 of tiler 220 uses vertex indices received from memory 6 to assemble primitives and generate packets, and issues requests for vertex processing of packets to shader cores 200. In response to the requests, shader cores 200 read in vertex data from memory 6, transform the vertex data, and write out transformed vertex data to packets via L2 cache 102 and ASN 101. When vertex processing is completed, shader cores 200 signal to the tiler frontend 310 that vertex processing is completed.

The vertex fetcher 321 of the tiler backend 320 then fetches the transformed vertex data, and passes it to the remaining processing stages of the tiler backend 320. FIG. 7A illustrates the transformed vertex data being fetched from L2 cache 102, but it will be appreciated that the transformed vertex data may need to be fetched from memory 6, e.g. depending on the capacity and status of the L2 cache 102. Tiler backend then assembles primitives 322, performs culling and bounding box generation 323, and writes out 324 bounding box information to memory 6.

Although in this embodiment, both the tiling frontend 310 and backend 320 processes are performed by hardware units of a tiler 220, other arrangements are possible. For example, FIG. 7B shows schematically an embodiment in which the tiling frontend process 310 is performed in hardware by tiler (geometry processing control unit) 220, and the tiler backend process 320 is performed in software by shader cores 200 executing appropriate shader programs.

Figure 7B:
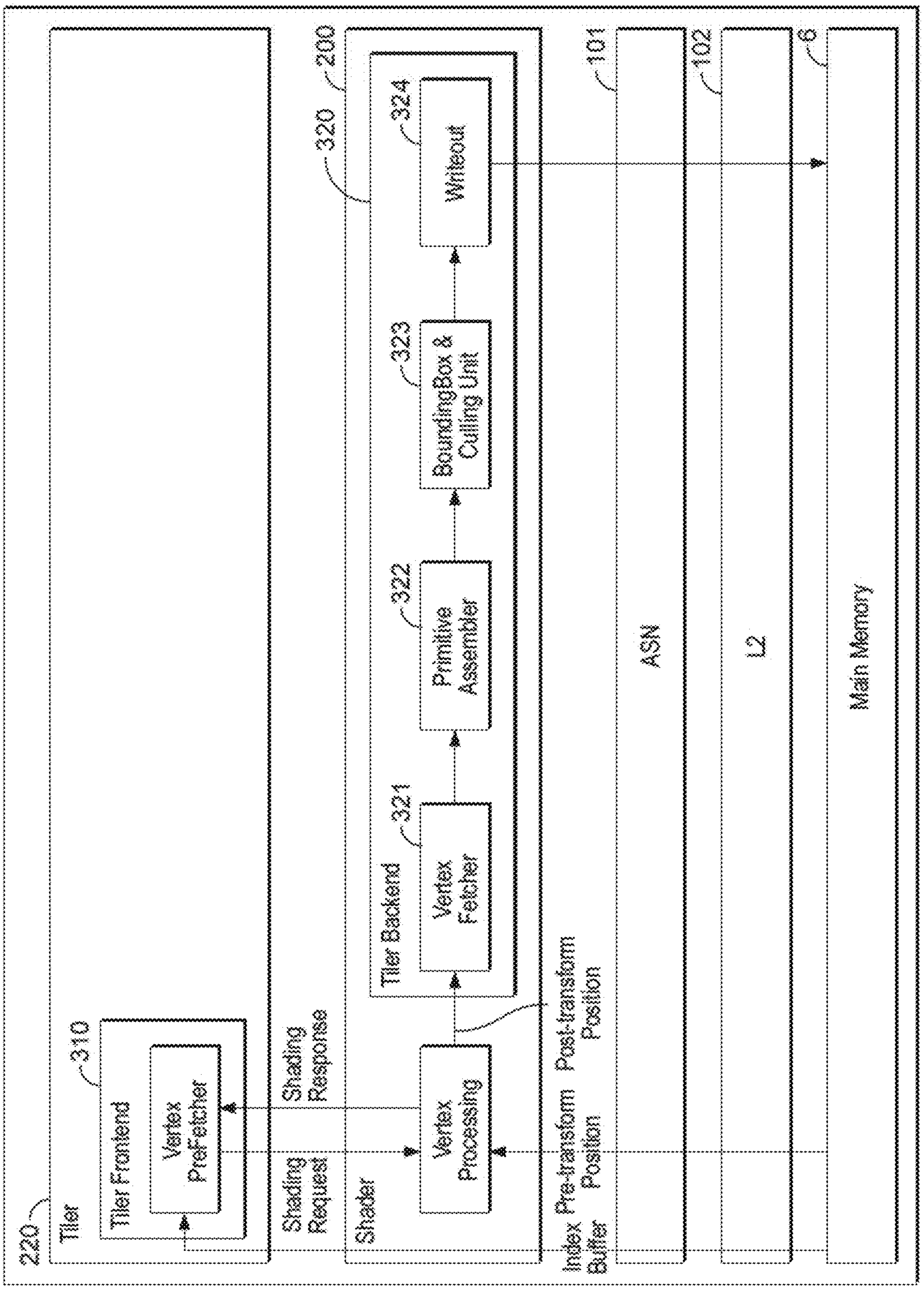
FIG. 7B shows a tile-based graphics processing pipeline according to embodiments.

As illustrated in FIG. 7B, in this embodiment, tiler frontend 310 of tiler 220 uses vertex indices received from memory 6 to assemble primitives and generate packets, and issues requests for vertex processing of packets to shader cores 200. In response to the requests, shader cores 200 read in vertex data from memory 6, and (their execution engines 240) execute vertex shading programs to transform the vertex data.

When vertex processing for a packet is completed, (execution engines 240 of) shader cores 200 execute shader programs to perform the tiling backend process 320 for the packet. Thus, the transformed vertex data 321 for a packet is used to assemble primitives 322, culling and bounding box generation 323 is performed, and then bounding box information is written out 324.

Alternatively, the tiling frontend process 310 may be performed by tiler (geometry processing control unit) 220, and the tiler backend process 320 may be performed by (hardware) circuits that are integrated with the shader cores 200. In this embodiment, a shader core 200 comprises an execution engine 240 and a tiler backend circuit 320 that includes a packet fetcher circuit 321, a primitive assembly circuit 322, a bounding box generation circuit 323 and a writeout circuit 324 configured to perform the backend processes described above.

Since, in these embodiments, the transformed vertex data is generated by, and subsequently processed by, shader cores 200, the transformed vertex data may remain in the L2 cache 102, and the need for the transformed vertex data to be written out to memory 6 and then read back into the tiler 220 at the start of the backend process 320 (e.g. as may be done in the embodiment of FIG. 7A) can be avoided. This can accordingly reduce memory bandwidth requirements.

Once a bounding box hierarchy has been generated, it is used in a subsequent fragment processing pass to generate respective tiles of the overall render output. In the present embodiment, these "fragment stages" start with a hierarchical bounding box reader stage reading the bounding box hierarchy. The hierarchical bounding box reader stage thus, in embodiments, replaces the primitive list reader 232 described above.

Figure 8:
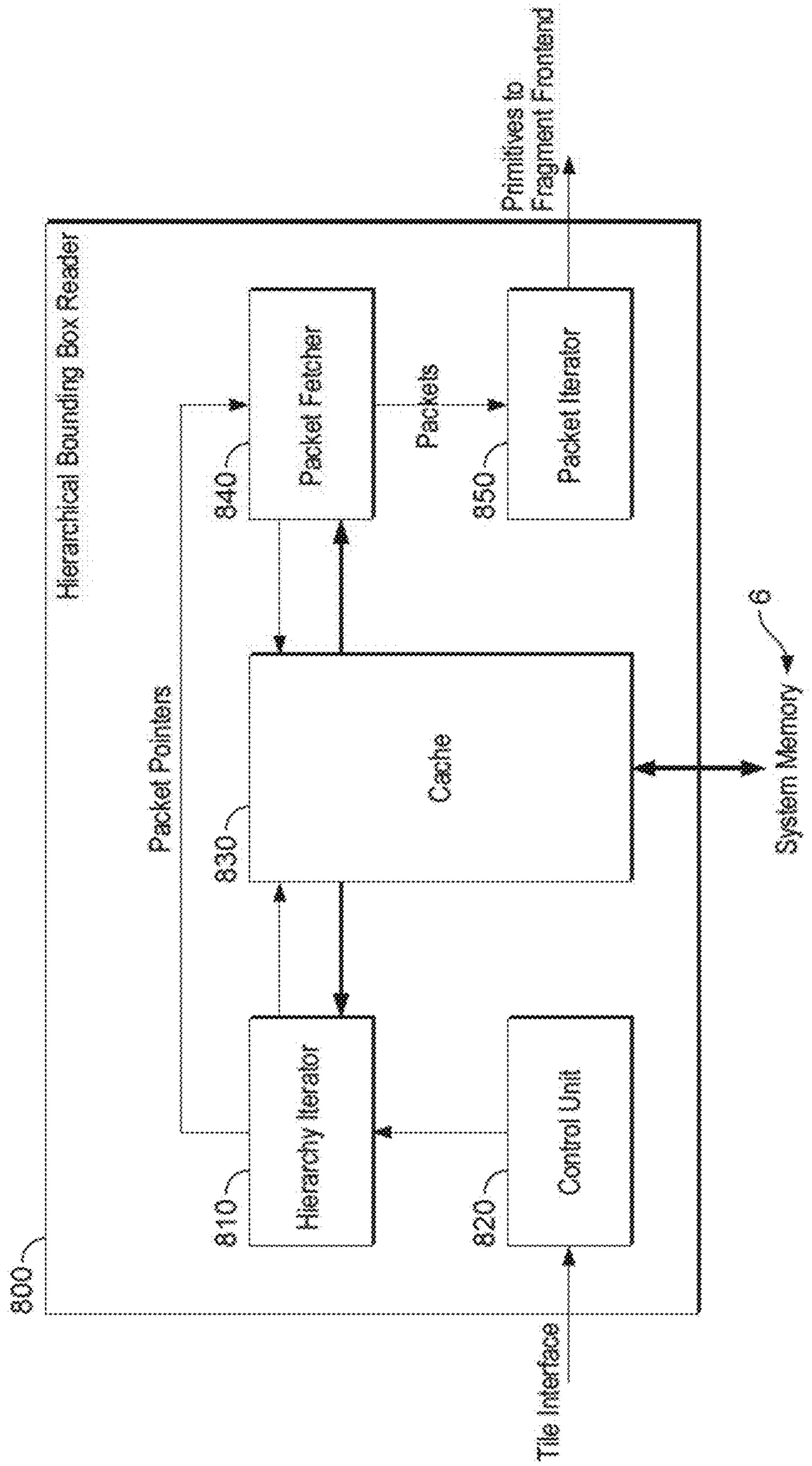
FIG. 8 shows a hierarchical bounding box reader of a tile-based graphics processor in accordance with embodiments.

FIG. 8 illustrates schematically the hierarchical bounding box reader 800 according to the present embodiment. The hierarchical bounding box reader 800 reads the bounding box hierarchy data from memory 6 into cache 830, and control unit 820 controls hierarchy iterator 810 to iterate through the bounding box hierarchy data in order to identify packets whose packet bounding box overlaps the current tile being processed. The iteration is such that packets will be identified in the order in which they were generated.

In the present embodiment, this involves first determining whether the current tile overlaps a highest-level bounding box of the hierarchy. For each highest-level bounding box that the current tile is found to overlap, next lower-level bounding box information is used to determine whether the current tile overlaps a next lower-level bounding box of the hierarchy that is covered by the respective highest-level bounding box, and so on, until the packet bounding box hierarchy level is reached.

When a packet whose packet bounding box overlaps the current tile is identified, packet fetcher 840 may fetch the packet data into cache 830, and then packet iterator 850 iterates through the primitives in the packet in order to identify primitives whose primitive bounding box overlaps the current tile being processed. The iteration is such that primitives will be identified in the order in which they were originally specified.

When a primitive whose primitive bounding box overlaps the current tile is identified, the primitive is output by the hierarchical bounding box reader 800 to the subsequent stages of the fragment processing pipeline. The primitive may thus be passed to the resource allocator 233 for processing, e.g. as described above. The primitive may thus be rasterised and rendered appropriately.

Figure 9:
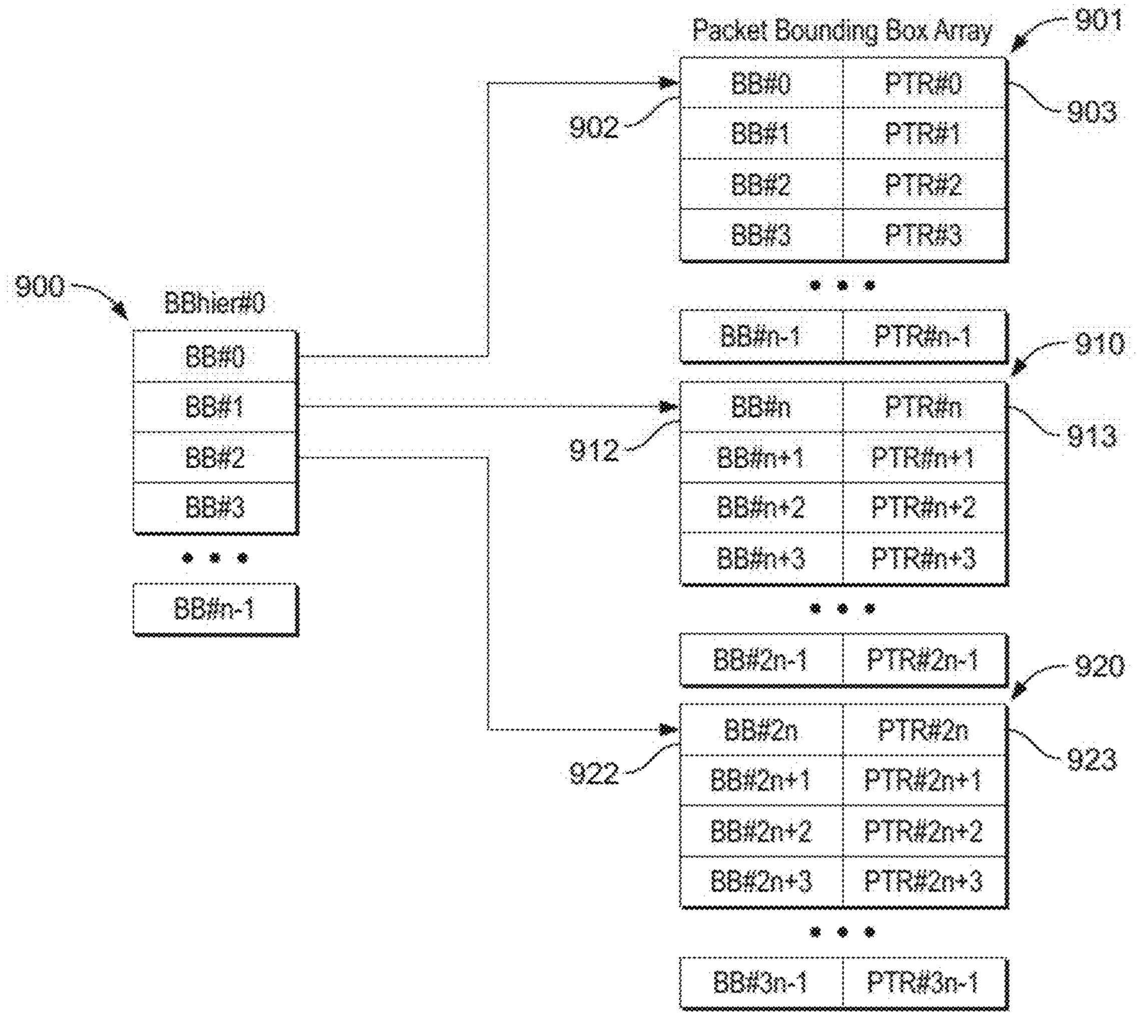
FIG. 9 shows a memory layout for storing bounding box information.

FIG. 9 illustrates one way in which bounding box information could be stored in memory 6. As illustrated in FIG. 9, a bounding box hierarchy array 900 may be maintained, with each entry of the array comprising a pointer pointing to another array that defines bounding boxes for a respective level of the bounding box hierarchy.

As shown in FIG. 9 the first entry of the bounding box hierarchy array 900 may point to a packet array 901 that includes pointers 903 that point to respective packets stored in memory 6, and packet bounding box information 902 that defines the respective packet bounding boxes.

Similarly, the next entry of the bounding box hierarchy array 900 may point to a higher-level array 910, each entry of which comprising a respective "higher level" bounding box 912, and pointers 913 pointing to the packet array 901 entries for the packet bounding boxes from which the respective "higher level" bounding box was generated. The next entry of the bounding box hierarchy array 900 may point to a still higher-level array 920 with entries comprising respective "still higher level" bounding boxes 922, and pointers 923 pointing to the corresponding entries in the next lower level array 910, and so on, up to a "highest" level for the draw call/render output in question.

The inventors have recognised, however, that this arrangement can be relatively inefficient in terms of overall usage of memory, and also may be difficult to manage due to there being a relatively large number of pointers and indirections.

Figure 10:
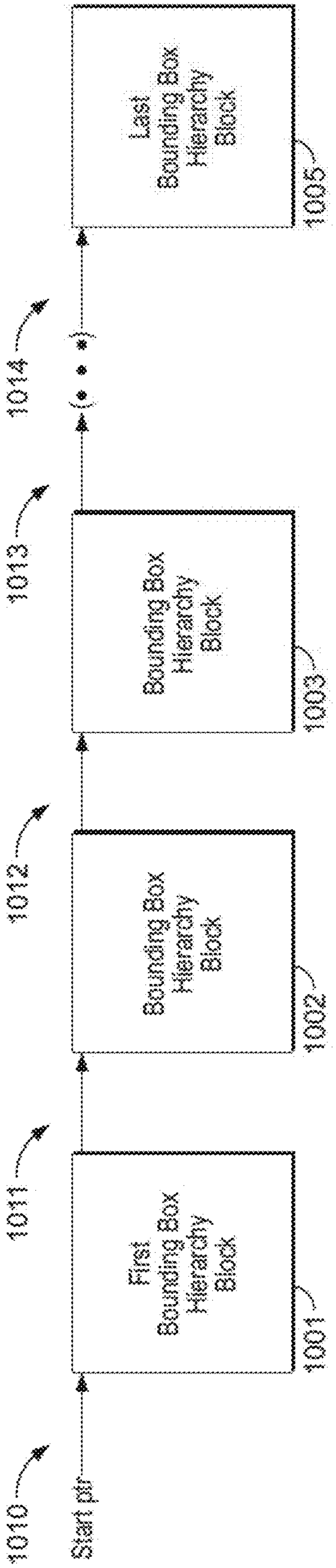
FIG. 10 shows a linked-list memory layout for storing bounding box information.

FIG. 10 illustrates another arrangement for storing bounding box information in memory 6. As illustrated in FIG. 10, in this arrangement, bounding box information for a render output (e.g. frame) is stored in one or more blocks of memory space 1001-1005 that are arranged in a linked list, with a start pointer 1010 pointing to the first block of memory space 1001 in the linked list, and blocks of memory space 1001-1003 comprising a pointer 1011-1014 that can point to the next block of memory space in the linked list.

As discussed above, the inventors have found that while using a linked list such as illustrated in FIG. 10 can facilitate efficient, simple and flexible memory management, in such arrangements a block of memory space can typically only be located by following each pointer from each preceding block in the linked list, which can cause read latency.

Figure 11:
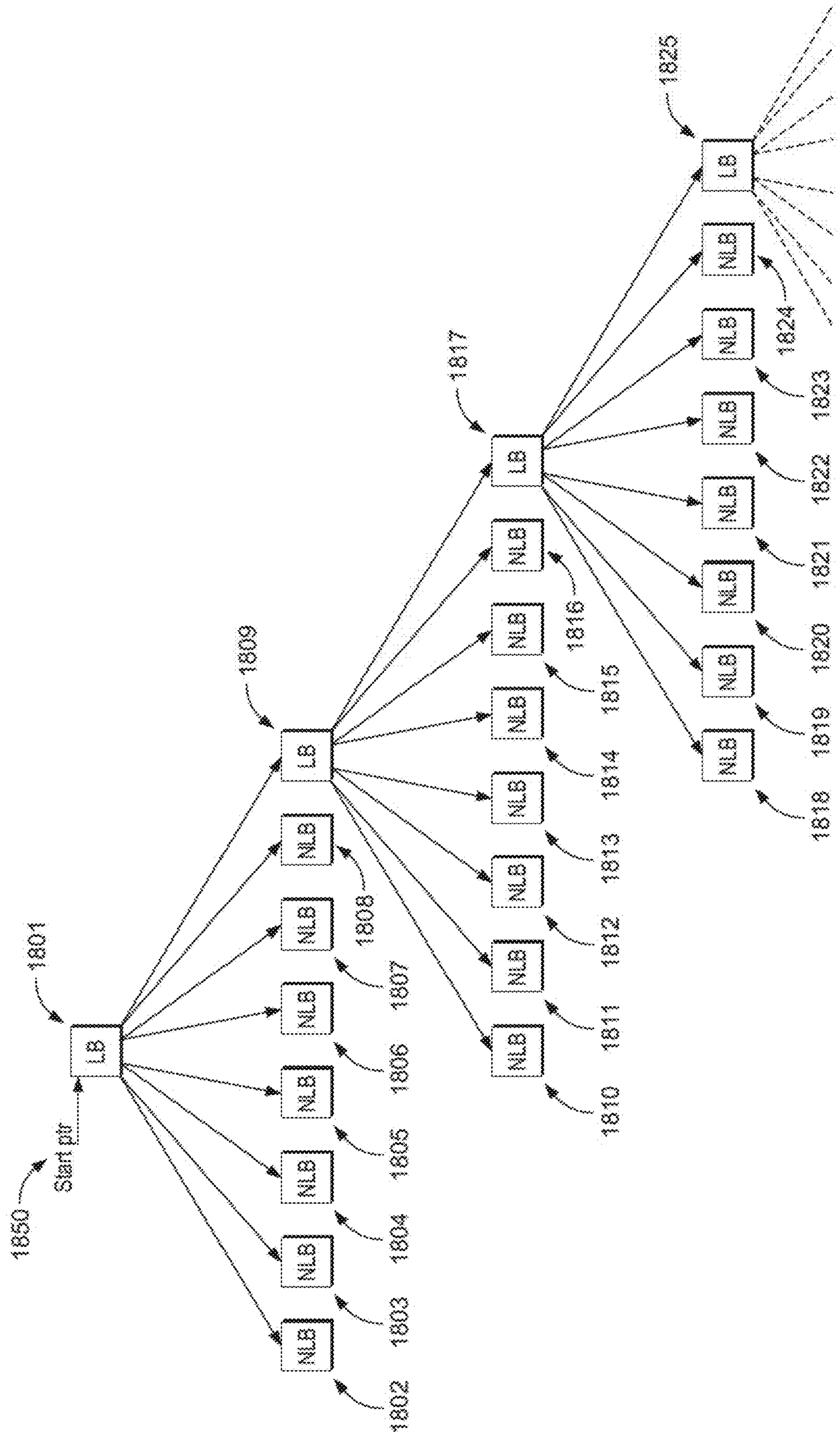
FIG. 11 shows a memory layout for storing bounding box information having linking and non-linking memory blocks in accordance with embodiments.

FIG. 11 illustrates an arrangement for storing bounding box information in memory 6, in accordance with embodiments of the technology described herein. As illustrated in FIG. 11, in embodiments of the technology described herein, bounding box information for a render output (e.g. frame) is stored in a set of one or more linked blocks of memory space 1801-1825, with a start pointer 1850 pointing to the first block of memory space 1801 in the set. Each respective block of memory space can be allocated dynamically, and stores bounding box information in a "self-contained" manner, i.e. such that a higher-level bounding box will be stored in the same block as all of the packet bounding boxes from which the higher-level bounding box was generated.

In embodiments of the technology described herein, rather than each block in the set comprising a pointer that can point to the next block in the set (e.g., as in the arrangement of FIG. 10), only some blocks in the set can have pointers. In particular, as shown in FIG. 11, in embodiments of the technology described herein, blocks of memory space are either "linking blocks" (LB) 1801, 1809, 1817, 1825 or "non-linking blocks" (NLB) 1802-1808, 1810-1816, 1818-1824. As shown in FIG. 11, a linking block can comprise multiple pointers pointing to multiple other blocks, whereas a non-linking block does not have any pointers pointing to other blocks. This arrangement can avoid the need to read every block in order, and thereby reduce latency (e.g., as compared to the arrangement of FIG. 10).

Figure 12:
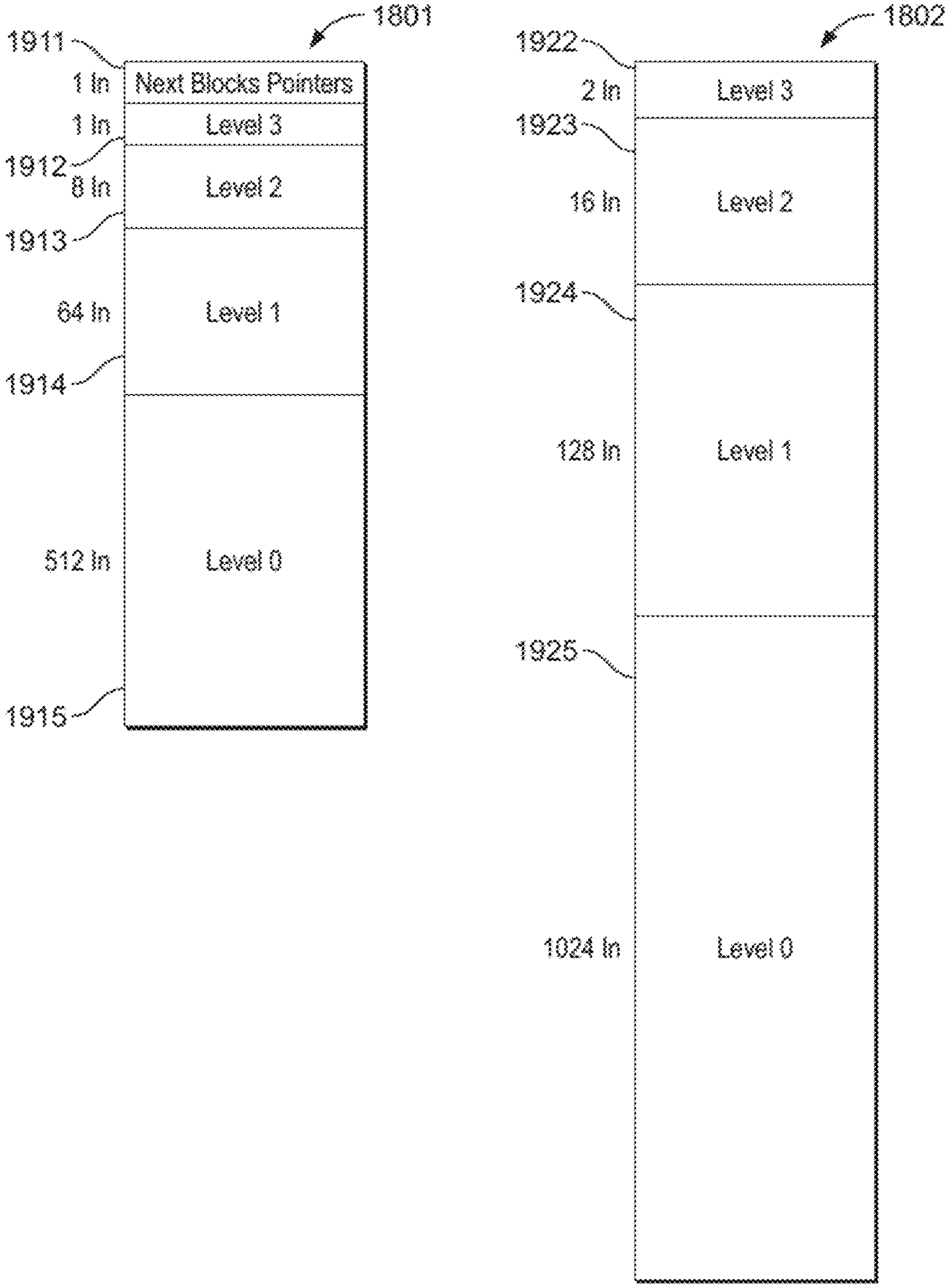
FIG. 12 shows linking and non-linking memory blocks for storing bounding box information in accordance with embodiments.

FIG. 12 shows a linking block 1801 and a non-linking block 1802 in more detail in accordance with embodiments of the technology described herein. As illustrated in FIG. 12, each block of memory space 1801, 1802 is arranged as a set of equally-sized lines, wherein the size of a line is an integer number of cache lines, such that each block is cache-line aligned. In this embodiment, each line is 512 bits in size. Other block/line sizes, numbers of lines, etc., would be possible.

As shown in FIG. 12, in the present embodiment, the first line of a linking block is a header 1911 that can include a sequence of plural pointers that each point to the start of (the first line of) another block of memory space in the set. The header 1911 may include a null pointer to indicate an end of the sequence of blocks. The remaining lines of a linking block 1801 then store a "self-contained" hierarchy of bounding boxes. As shown in FIG. 12, in the present embodiment, a non-linking block 1802 does not have a header storing pointers, and all lines of the block store a "self-contained" hierarchy of bounding boxes.

As shown in FIG. 12, in the present embodiment, linking block 1801 comprises five-hundred and twelve "Level 0" lines 1915 that store packet bounding boxes. Linking block 1801 further comprises sixty-four "Level 1" lines 1914 that store bounding boxes for groups of four packet bounding boxes (i.e. groups of four "Level 0" bounding boxes). Linking block 1801 further comprises eight "Level 2" lines 1913 that store bounding boxes for groups of eight "Level 1" bounding boxes. Linking block 1801 further comprises one "Level 3" line 1912 that stores bounding boxes for groups of eight "Level 2" bounding boxes. In this embodiment, as shown in FIG. 12, non-linking block 1802 has space 1922-1925 for two times as many bounding boxes as linking block 1801. Other arrangements are possible. For example, non-linking block and linking blocks may have space for the same number of bounding boxes.

Figure 13:
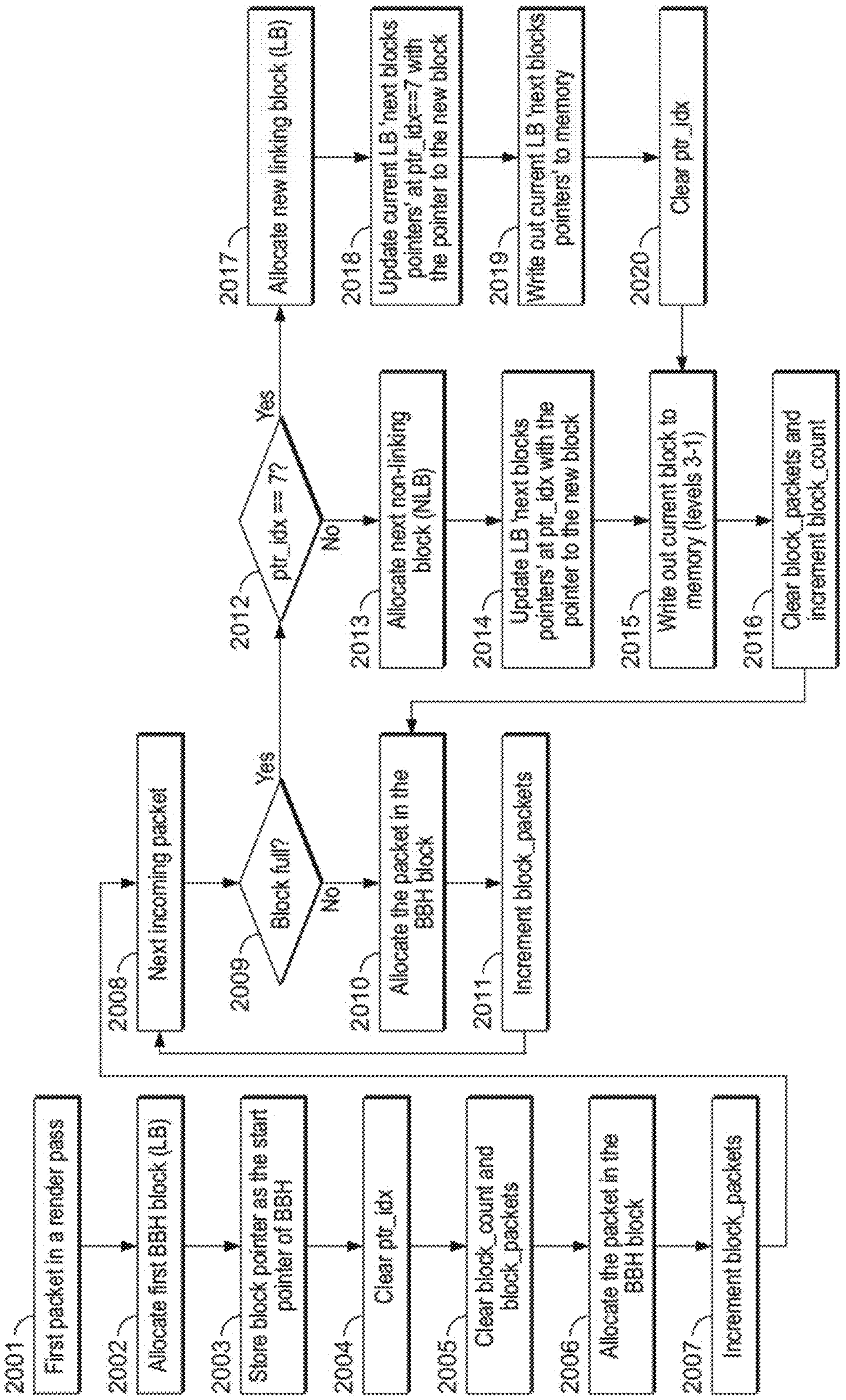
FIG. 13 shows a process for allocating memory for storing bounding box information in accordance with embodiments.

FIG. 13 shows a dynamic memory allocation process in accordance with the present embodiment. As shown in FIG. 13, when packet generator 313 of the tiler frontend 310 generates a first packet for a render pass (step 2001), packet generator 313 allocates (reserves) a first, linking block of memory space 1801 in memory 6 (step 2002) for storing bounding box information for the render pass (that is to be generated by the tiler backend 320), and a start pointer 1850 pointing to the start of the first allocated block of memory space 1801 is stored (step 2003).

An index that tracks the number of pointers in the current linking block 1801 (ptr_idx) is set to zero (step 2004). A counter of the current number of blocks in the set (block_count) and a counter of the current number of packets in the current memory block (block_packets) are also set to initial values (step 2005). In the present embodiment, these latter two counters are used to generate a unique ID for each packet, in order to keep track of the packets and the order in which the packets are generated. The packet ID may, for example, comprise one or more (e.g. top) bits that encode block number (block_count) and one or more (e.g. bottom) bits that encode packet position within a block (block_packets).

Space for storing bounding box information for the first packet is then allocated in the first (linking) block of memory space 1801 (step 2006), and the packet counter (block_packets) is incremented (step 2007).

Then, when the tiler frontend 310 generates a next packet for the render pass (step 2008), it is determined whether the first (linking) block of memory space 1801 in the set is full (step 2009). If the first block of memory space 1801 in the set is not full, space for storing bounding box information for the packet is allocated in the first block of memory space 1801 (step 2010), and the packet counter (block_packets) is incremented (step 2011).

As illustrated in FIG. 13, this process of attempting to allocate space to store bounding box information for packets in the first block of memory space 1801 (steps 2008-2011) is repeated until the first (linking) block of memory space 1801 becomes full (or until space for bounding box information for all of the packets for the current render pass has been allocated in the first block of memory space 1801).

If it is determined (at step 2009) that the first block of memory space 1801 in the set is full, then a second block of memory space 1802 is allocated in memory 6 and added to the set. In the present embodiment, the type of block that is added (i.e. whether a linking block or a non-linking block is added) depends on the number of pointers stored in the current linking block 1801. In the present embodiment, a linking block can include a maximum of seven pointers that point to non-linking blocks and one pointer that points to a linking block, and the type of block to add is determined by determining whether the pointer index (ptr_idx) has reached the maximum number of non-linking blocks (i.e. seven) (step 2012). Other maximum numbers would be possible.

In the present embodiment, when the first block of memory space 1801 is determined to be full, the pointer index (ptr_idx) will still be zero, and so a non-linking block of memory space 1802 is allocated as the second block in the set (step 2013), a pointer pointing to the start of the second (non-linking) block of memory space 1802 is stored in a header of the first linking block of memory space 1801, and the pointer index (ptr_idx) is incremented (step 2014).

Bounding box information for the first block of memory space 1801 may then be written out to memory 6 (step 2015)

(by the write out stage 324 of tiler backend 320), the block counter (block_count) is incremented, and the packet counter (block_packets) is re-set to the initial value (step 2016). Space for storing bounding box information for the current packet is then allocated in the second (non-linking) block of memory space 1802 in the set (step 2010), and the packet counter (block_packets) incremented (step 2011).

This process of attempting to allocate space to store bounding box information for packets in the last block of memory space in the set, and adding a new non-linking block of memory space to the set if full, is repeated until the maximum number of pointers to non-linking blocks have been stored in the current linking block 1801 (or until space for storing bounding box information for all of the packets for the current render pass has been allocated in the set).

When it is determined (at step 2012) that the number of pointers stored in the current linking memory block 1801 has reached the maximum number of non-linking blocks, a new linking block of memory space 1809 is allocated (step 2017), and a pointer pointing to the start of the new linking block of memory space 1809 is stored in the header of the first linking block of memory space 1801 (step 2018). The pointer header of the first linking block of memory space 1801 may then be written out to memory 6 (step 2019), and the pointer index (ptr_idx) cleared to zero (step 2020).

Bounding box information for the previous block of memory space 1808 may then be written out to memory 6 (step 2015), the block counter (block_count) is incremented, and the packet counter (block_packets) is re-set to the initial value (step 2016). Space for storing bounding box information for the current packet is then allocated in the new linking block of memory space 1809 in the set (step 2010), and the packet counter (block_packets) incremented (step 2011).

This process of adding non-linking and linking blocks is repeated as necessary until space for storing bounding box information for all of the packets for the current render pass has been allocated in the set.

Thus, in embodiments of the technology described herein, the number of blocks in the set is increased (only) if additional memory is required. This can facilitate a more efficient use of memory for storing bounding box information, e.g. as compared to the arrangement of FIG. 9, where a maximum possible amount of memory space may need to be allocated "up front".

Figure 14:
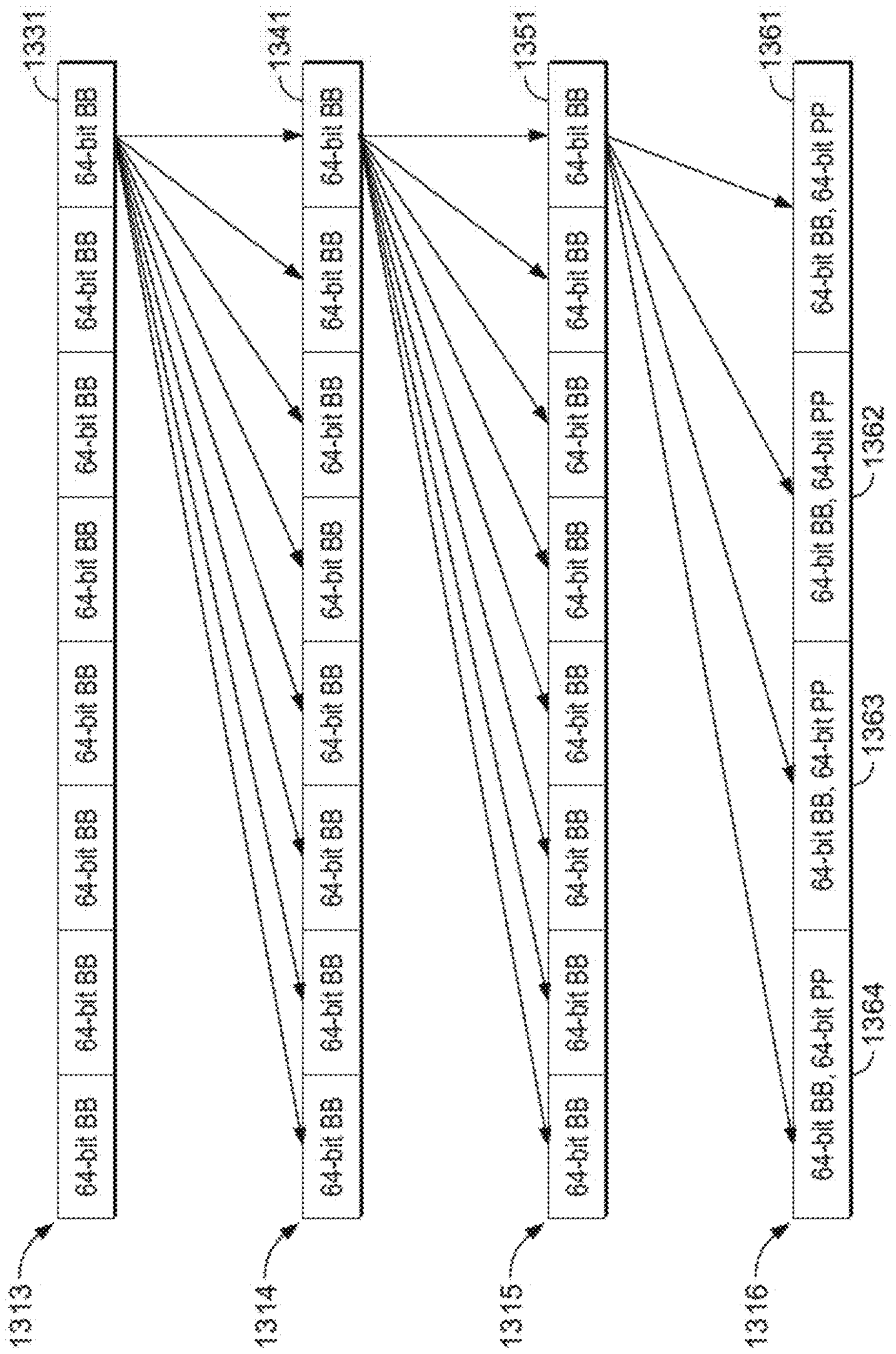
FIG. 14 shows a hierarchical layout for storing bounding box information in accordance with embodiments.

FIG. 14 shows in more detail a set of related lines of a bounding box hierarchy stored in a (linking or non-linking) block 1801, 1802, in accordance with the present embodiment. As illustrated in FIG. 14, in the present embodiment, each "Level 3" line 1313 stores eight "Level 3" bounding boxes using 64-bits per bounding box (16-bits for a minimum x value, 16-bits for a maximum x value, 16-bits for a minimum y value, and 16-bits for a maximum y value). Similarly, each "Level 2" line 1314 stores eight "Level 2" bounding boxes using 64-bits per bounding box, and each "Level 1" line 1315 stores eights "Level 1" bounding boxes using 64-bits per bounding box. As shown in FIG. 14, each "Level 0" line 1316 stores four "Level 0" packet bounding boxes using 64-bits per bounding box, together with four 64-bit packet pointers that point to the corresponding packets stored in memory 6. Other numbers of levels, relationships between levels, storage arrangements, etc., would be possible.

In the present embodiment, space for storing bounding box information for packets is allocated in blocks following the order in which the packets are generated by the tiler frontend 310. Thus, for example, packet bounding box and pointer information for the first packet generated for a render pass may be stored in a first entry 1361 of a first "Level 0" line 1316 in a first block 1801 of the set. Packet bounding box and pointer information for second, third and fourth packets generated for the render pass may then be stored in second, third and fourth entries 1362, 1363, 1364, respectively, of the first "Level 0" line 1316 in the first block 1801 of the set.

Packet bounding box and pointer information for the next four packets generated for the render pass may then be stored in first to fourth entries, respectively, of a second "Level 0" line in the first block 1801 of the set, and so on, until all of the "Level 0" lines 1915 of the first block 1801 of the set are full. Packet bounding box and pointer information for subsequent packets generated for the render pass may then be stored in "Level 0" lines 1925 in a second block 1802 of the set in a corresponding manner, and so on, until packet bounding box and pointer information for all of the packets generated for the render pass are stored in the set.

In the present embodiment, the relationship that a bounding box has with other bounding boxes in a hierarchy stored in a block is implicit from the line in which the bounding box is stored and the entry within the line that the bounding box is stored. In particular, each bounding box stored in a higher-level line is implicitly related to (and bounds) all of the bounding boxes that are stored in a respective one of the next highest-level lines. The relationships may be such that related addresses can be calculated using relatively simple circuitry, e.g. using a few shifters.

For example, as illustrated in FIG. 14, "Level 3" bounding box 1331 bounds all of the bounding boxes stored in a corresponding "Level 2" line 1314, "Level 2" bounding box 1341 bounds all of the bounding boxes stored in a corresponding "Level 1" line 1315, and "Level 1" bounding box 1351 bounds all of the bounding boxes stored in a corresponding "Level 0" line 1316. (And a "Level 0" packet bounding box bounds all of the primitive bounding boxes of the corresponding packet.)

Figure 15:
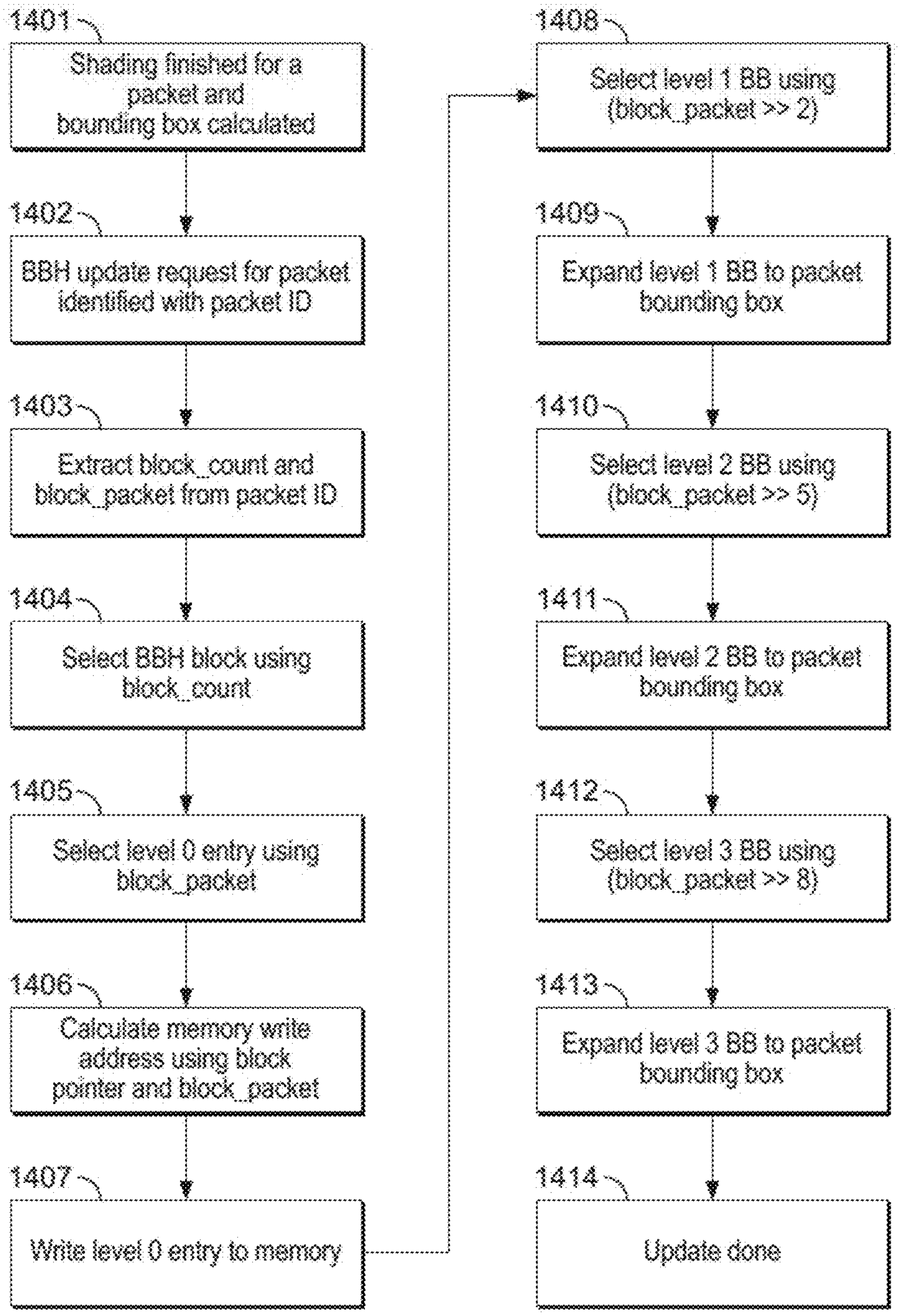
FIG. 15 shows a process for updating bounding box information in memory in accordance with embodiments.

FIG. 15 shows a process of updating the set of linked blocks in accordance with embodiments of the technology described herein (which may correspond to step 2015, 2019 of FIG. 13). As shown in FIG. 15, once primitive and packet bounding boxes have been generated for a packet (at step 1401) by tiler backend 320, an update to the bounding box hierarchy is requested (step 1402). The packet ID for the packet is used (step 1403) to determine the block in the set to be updated (step 1404), the "Level 0" line 1316 in that block to be updated (step 1405), and the entry 1361 in that "Level 0" line to be updated (step 1406). Packet bounding box and pointer information for the packet is then written to memory 6 in the determined location 1361 (step 1407).

The related higher-level entries in the block are then updated. To do this, the packet ID is used to determine the corresponding "Level 1" line 1315 in the block to be updated and the entry 1351 in that "Level 1" line to be updated (step 1408), and the packet bounding box is then used to expand the "Level 1" bounding box currently stored in the determined "Level 1" line entry 1351 (step 1409).

The packet ID is then used to determine the corresponding "Level 2" line 1314 in the block to be updated and the entry 1341 in that "Level 2" line to be updated (step 1410), and the packet bounding box is then used to expand the "Level 2" bounding box currently stored in the determined "Level 2" line entry 1341 (step 1411).

The packet ID is then used to determine the corresponding "Level 3" line 1313 in the block to be updated and the entry 1351 in that "Level 3" line to be updated (step 1412), and the packet bounding box is then used to expand the "Level 3" bounding box currently stored in the determined "Level 3" line entry 1351 (step 1413). Updating the bounding box hierarchy for the current packet is then complete (step 1414).

Although FIG. 15 shows different levels/entries of the hierarchy being updated sequentially, it would also be possible to update different levels/entries of the hierarchy in parallel (at the same time).

Figure 16:
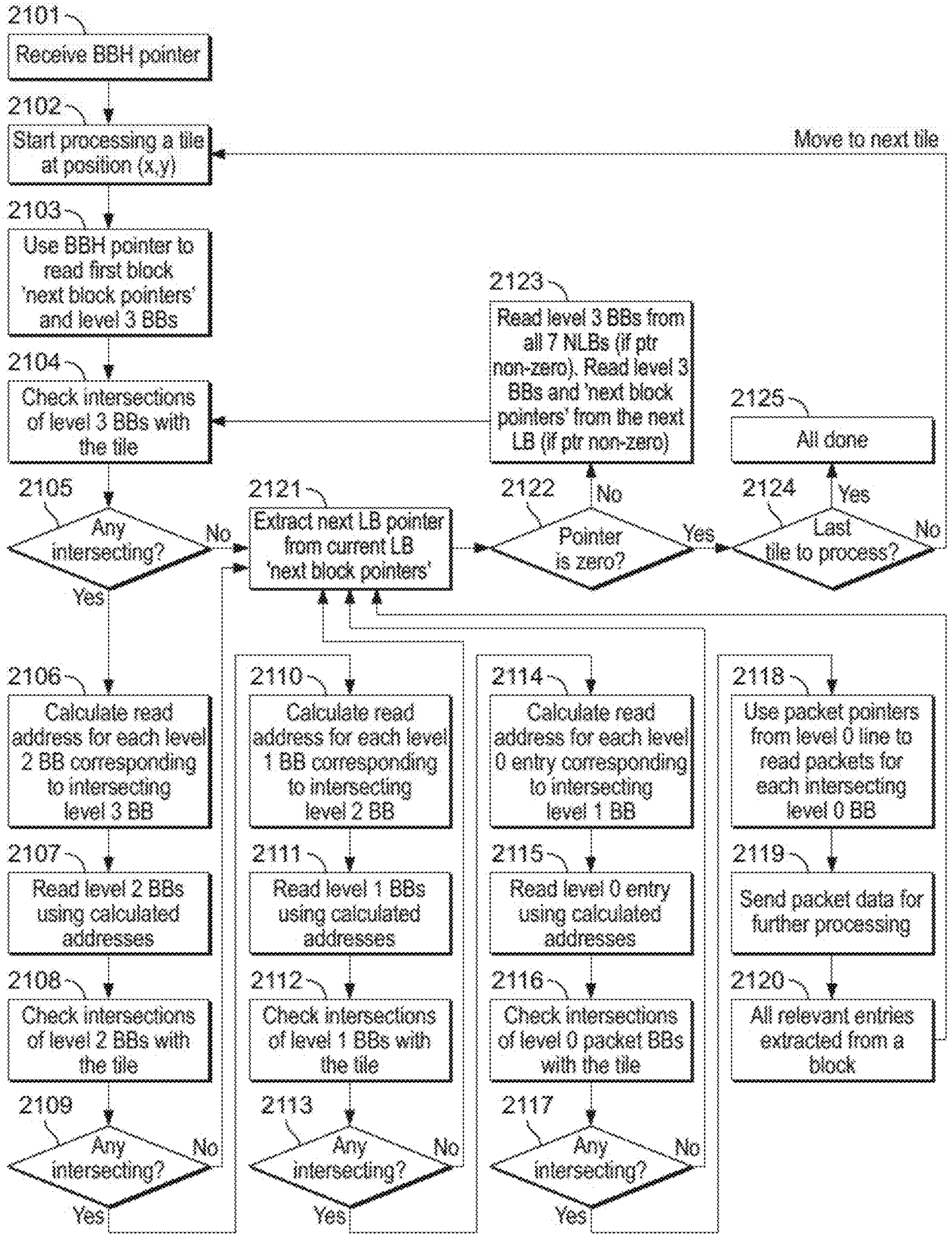
FIG. 16 shows a process for reading bounding box information from memory in accordance with embodiments.

Once the bounding box hierarchy stored in the set of linked blocks in memory 6 has been updated with all of the packets for the render output/pass, the bounding box hierarchy is read by the hierarchical bounding box reader 800 and used in the subsequent fragment processing pass to generate respective tiles of the render output. FIG. 16 shows this process in accordance with embodiments of the technology described herein.

As shown in FIG. 16, the hierarchical bounding box reader 800 receives the start pointer 1850 for the bounding box hierarchy (step 2101), and begins processing a first rendering tile of the render output (step 2102). The start pointer 1850 is used to read in the header 1911 of the first linking block of memory space 1801 in the set and the (first) "Level 3" line 1912 of the first block of memory space 1801 (step 2103). It is then determined whether the first rendering tile overlaps any of the "Level 3" bounding boxes stored in the "Level 3" line 1912 of the first block of memory space 1801 (steps 2104, 2105). The output of this test may be a string of bits, with each respective bit being set if a corresponding bounding box is intersected.

For each "Level 3" bounding box in the "Level 3" line 1912 of the first block of memory space 1801 that the first tile is found to overlap, the corresponding "Level 2" line 1913 of the first block of memory space 1801 is determined (step 2106) and read in (step 2107). It is then determined whether the first rendering tile overlaps any of the "Level 2" bounding boxes stored in the corresponding "Level 2" line(s) 1913 of the first block of memory space 1801 (steps 2108, 2109). The output of this test may be a string of bits, with each respective bit being set if a corresponding bounding box is intersected.

For each "Level 2" bounding box in the "Level 2" line(s) 1913 of the first block of memory space 1801 that the first tile is found to overlap, the corresponding "Level 1" line 1914 of the first block of memory space 1801 is determined (step 2110) and read in (step 2111). It is then determined whether the first rendering tile overlaps any of the "Level 1" bounding boxes stored in the corresponding "Level 1" line(s) 1913 of the first block of memory space 1801 (steps 2112, 2113). The output of this test may be a string of bits, with each respective bit being set if a corresponding bounding box is intersected.

For each "Level 1" bounding box in the "Level 1" line(s) 1914 of the first block of memory space 1801 that the first tile is found to overlap, the corresponding "Level 0" line 1915 of the first block of memory space 1801 is determined (step 2114) and read in (step 2115). It is then determined whether the first rendering tile overlaps any of the "Level 0" packet bounding boxes stored in the corresponding "Level 0" line(s) 1915 of the first block of memory space 1801 (steps 2116, 2117). The output of this test may be a string of bits, with each respective bit being set if a corresponding bounding box is intersected.

For each "Level 0" packet bounding box in the "Level 0" line(s) 1915 of the first block of memory space 1801 that the first tile is found to overlap, the corresponding packet pointer is used to read in the corresponding packet (step 2118). It is then determined whether the first rendering tile overlaps any of the primitive bounding boxes stored in the corresponding packet, and for each primitive bounding box in the packet that the first tile is found to overlap, the corresponding primitive is output for processing (rasterising and rendering) to generate the first tile (step 2119), e.g. as described above.

As shown in FIG. 16, if at any level of the hierarchy, it is determined that the first rendering tile does not overlap any bounding boxes (at step 2105, 2109, 2113 or 2117), then it can be determined that the first block of memory space 1801 does not have any primitives that need to be processed to generate the first tile.

Once all of the primitives of the first block of memory space 1801 that overlap the first tile have been output for processing (step 2120) or it has been determined (at step 2105, 2109, 2113 or 2117) that the first block of memory space 1801 does not have any primitives that need to be processed to generate the first tile, the next block pointer is extracted from the header 1911 of the first linking block of memory space 1801 (step 2121), and it is determined whether or not the pointer is a null pointer (step 2122).

If the next block pointer is not null, then the pointers in the header 1911 of the first linking block of memory space 1801 may be used to read in the "Level 3" lines 1922 of the next seven non-linking blocks of memory space 1802-1808, as well as the header and (first) "Level 3" line of the next linking block of memory space 1809 (step 2123). The process of determining and outputting any primitives that overlap the first tile (steps 2104-2123) is then performed in respect of these blocks 1802-1809, e.g. sequentially or in parallel (at the same time), and then the pointers in the header of the next linking block of memory space 1809 may be used to read in data for the next blocks 1810-1817, and so on.

Once all of the primitives for all of the blocks of memory space in the set that overlap the first tile have been output for processing (step 2120), the next block pointer is extracted from the header of the last linking block of memory space 1825 (step 2121), and it will be determined (at step 2122) that the next block pointer is null. In this case, it is then determined whether there are more rendering tiles to be generated for the render output (step 2124), and if so, the next (second) tile is processed accordingly (steps 2102-2124).

Once all of the rendering tiles for the render output have been processed, the render output is complete (step 2125). The process may then be performed in respect of the next render output (e.g. frame), and so on.

Although FIG. 16 shows different tiles being processed sequentially, it would be possible to process different tiles of the same render output in parallel (at the same time). For example, different shader cores 200, 201, 202 may process different tiles of the same render output, e.g. in parallel. Bounding box hierarchy information may (also) be cached by a graphics processor, and the cached data may be used to generate plural different tiles of the same render output.

Additionally or alternatively, it would be possible for different processes to perform different elements of the process of FIG. 16. For example, a first process may read in and process header and higher level ("Level 3") data, and a second, different process may read in a process lower level data.

Figure 17:
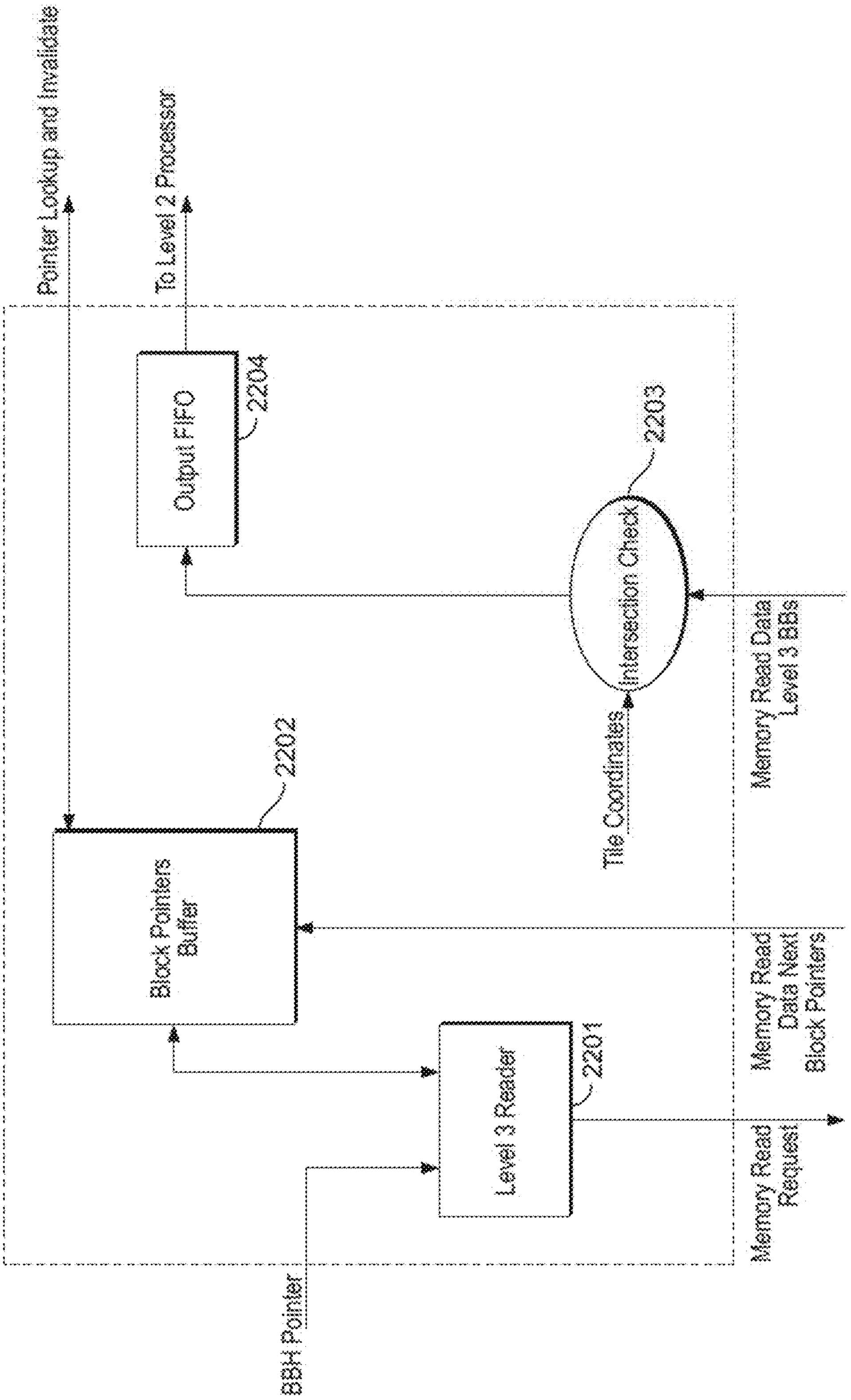
FIG. 17 shows element of a hierarchical bounding box reader of a tile-based graphics processor in accordance with embodiments.

FIG. 17 shows elements of a hierarchical bounding box reader 800 in accordance with the present embodiment. As shown in FIG. 17, the hierarchical bounding box reader 800 includes a Level 3 reader 2201 that is operable to, in response to receiving a start pointer 1850 to a linking block 1801, allocate an entry in block pointer buffer 2202, and use the start pointer 1850 to generate read requests for the header 1911 and Level 3 line 1912 of the linking block 1801. In response to these read requests, pointers in the linking block header 1912 may be read into the allocated entry of the block pointer buffer 2202, and Level 3 bounding boxes in the linking block Level 3 line 1912 may be provided to intersection checker 2203.

The Level 3 reader 2201 is also operable to, when plural pointers from a linking block are read into the block pointer buffer 2202, allocate another entry in the block pointer buffer 2202, and use the plural pointers to generate read requests for Level 3 lines of the next non-linking blocks 1802-1808, and the header and Level 3 line of the next linking block 1809 that the pointers point to. In response to these read requests, pointers in the header of the next linking block 1809 may be read into the allocated entry of the block pointer buffer 2202, and Level 3 bounding boxes in the Level 3 lines of the non-linking and linking blocks may be provided to intersection checker 2203.

The intersection checker 2203 compares tile coordinates with bounding box coordinates for each bounding box in each Level 3 line it receives, and for each intersecting Level 3 bounding box, sets a corresponding bit of a bitmask. In the present embodiment, the intersection checker 2203 is able to check plural Level 3 lines in parallel (at the same time), e.g. such that Level 3 lines from plural blocks 1802-1809 can be checked at the same time. If at least one bit is set in a Level 3 bitmask, the intersection checker 2203 may store an entry in output FIFO 2204 for further processing by a Level 2 processor. Output FIFO 2204 outputs entries in the same order as fetched by Level 3 reader 2201, so as to process blocks in order.

Figure 18:
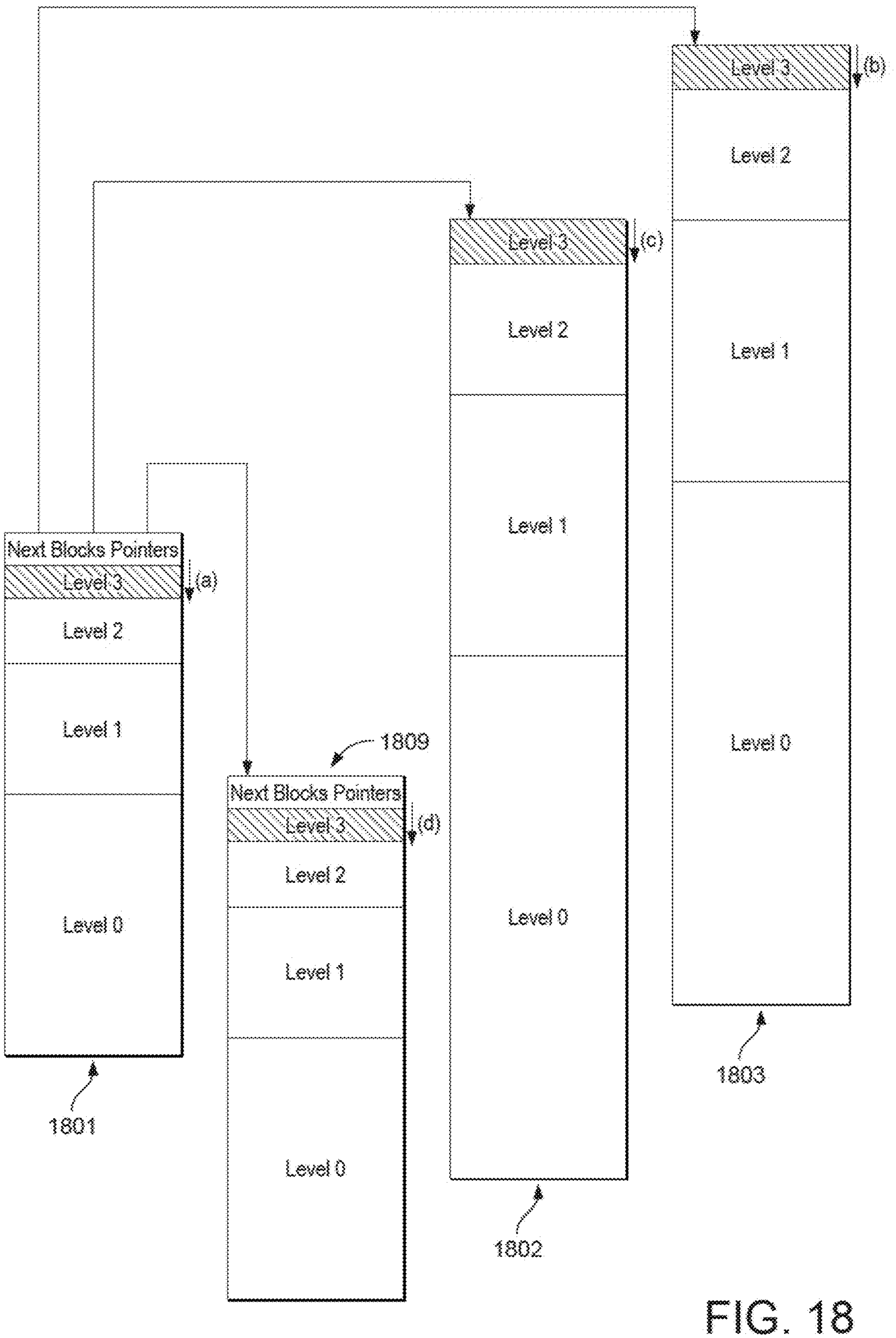
FIG. 18 shows linking and non-linking memory blocks for storing bounding box information in accordance with embodiments.

Although in the embodiments described above, a new linking block is added to the set after seven non-linking blocks have been added, other arrangements are possible. For example, FIG. 18 shows an embodiment in which a first linking block 1801 is provided, and then two non-linking blocks 1802, 1803 are provided before a new linking block 1809 is provided. Other arrangements are possible.

Figure 19:
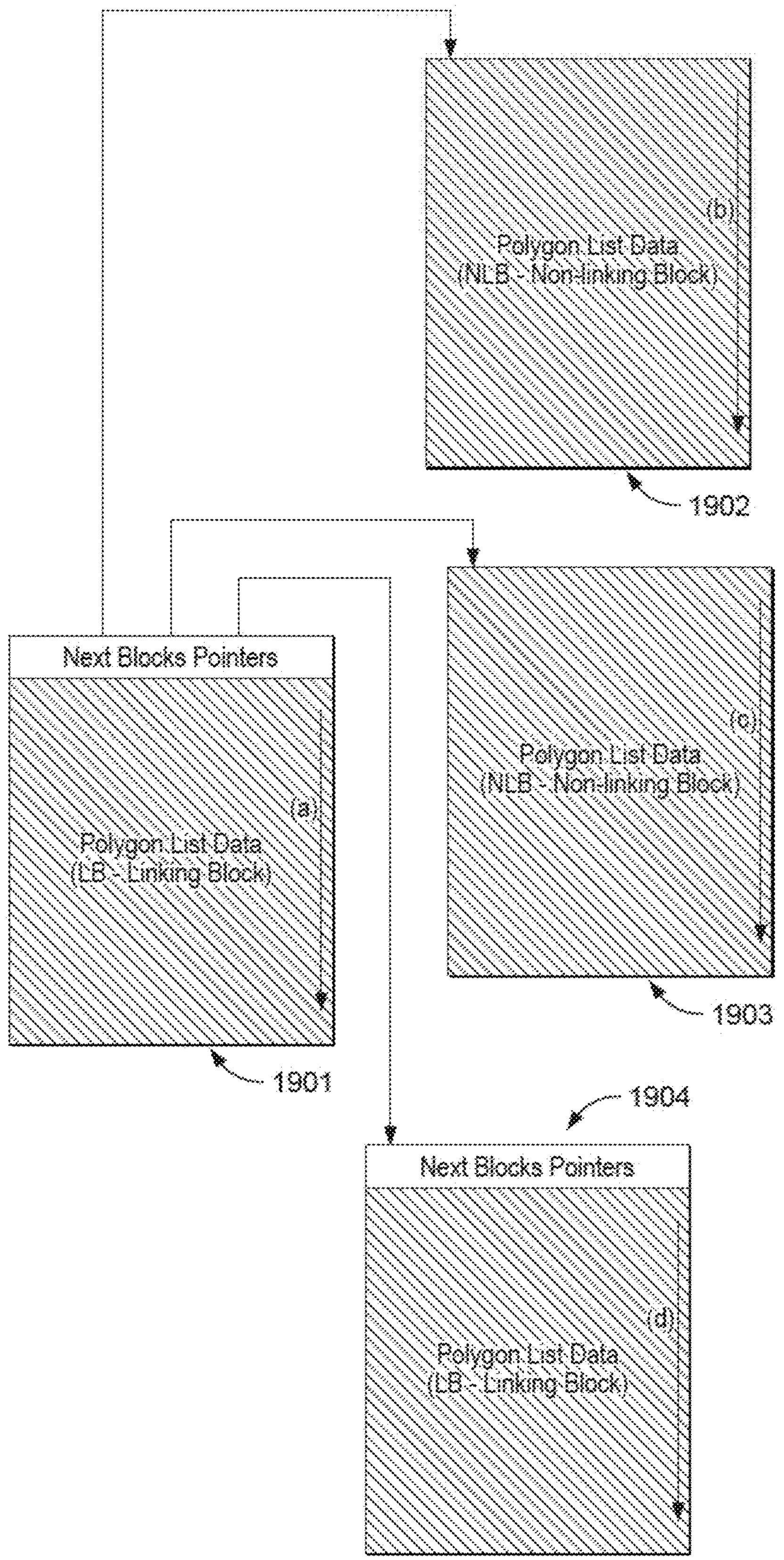
FIG. 19 shows linking and non-linking memory blocks for storing primitive lists in accordance with embodiments.

Although in the embodiments described above, bounding box information is stored in (and subsequently read from) linked memory space blocks, substantially the same arrangement of linked blocks may be used to store and read primitive lists. This is illustrated by FIG. 19. As shown in FIG. 19, primitive lists may initially be stored in a first linking memory space block 1901 that can include plural pointers pointing to a sequence of plural further memory space blocks 1902-1904, which may be added to set in a dynamic manner as required, e.g. as described above. As shown in FIG. 19, in the present embodiment, the sequence of further memory space blocks includes first and second non-linking memory space blocks 1902, 1903 that do not have any pointers, and then a second linking memory space block 1904 that can include plural further pointers pointing to a further sequence of memory space blocks. Other arrangements are possible.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a tile-based graphics processing system that is operable to generate a render output by generating and storing primitive information representative of positions of primitives to be processed to generate the render output, and reading and using the primitive information to identify which primitives to process to generate a rendering tile of the render output; the method comprising:
- generating primitive information to be used to identify which primitives of a set of primitives to process to generate the rendering tile of the render output; and
- storing the primitive information in a set of linked blocks of memory space;
- wherein at least one block of memory space of the set of linked blocks of memory space is a linking block of memory space that stores at least: (i) primitive information to be used to identify which primitives of the set of primitives to process to generate the rendering tile of the render output, (ii) a first link to a first other block of memory space of the set of linked blocks of memory space, and (iii) a second link to a second other block of memory space of the set of linked blocks of memory space; and
- wherein at least one of the first other block of memory space and the second other block of memory space is a non-linking block of memory space that stores primitive information to be used to identify which primitives of the set of primitives to process to generate the rendering tile of the render output, and does not store any links to other blocks of memory space of the set of linked blocks of memory space.

2. The method of claim 1, wherein storing primitive information comprises:
- storing primitive information in the linking block of memory space; and
- when the linking block of memory space is full of primitive information: adding the first other block of memory space to the set of linked blocks of memory space, storing primitive information in the first other block of memory space, and storing the first link to the first other block of memory space in the linking block of memory space; and
- when the first other block of memory space is full of primitive information: adding the second other block of memory space to the set of linked blocks of memory space, storing primitive information in the second other block of memory space, and storing the second link to the second other block of memory space in the same linking block of memory space as the first link to the first other block of memory space.

3. The method of claim 1, wherein storing primitive information comprises, for one or more packets of primitives:
- determining whether the set of linked blocks of memory space has insufficient memory space available to store primitive information for the respective packet of primitives; and
- when it is determined that the set of linked blocks of memory space has insufficient memory space available to store primitive information for the respective packet of primitives:
  - adding a block of memory space to the set of linked blocks of memory space; and storing primitive information for the respective packet of primitives in memory space of the block of memory space added to the set of linked blocks of memory space.

4. The method of claim 1, wherein the primitive information represents primitive lists.

5. The method of claim 1, wherein the primitive information represents bounding boxes.

6. The method of claim 5, comprising:

storing, in each respective block of memory space, bounding box information that defines at least two different levels of a respective hierarchy of bounding boxes.

7. The method of claim 6, comprising storing bounding box information that defines at least two different levels of a respective hierarchy of bounding boxes in a respective block of memory space by:

for one or more packets of primitives:

generating a packet bounding box that bounds all of the primitives of the respective packet;

storing the packet bounding box in the respective block of memory space; and updating, in the respective block of memory space, one or more related higher-level bounding boxes that bound the packet bounding box.

8. A non-transitory computer readable storage medium storing software code which when executing on a processor performs the method of claim 1.

9. A method of operating a tile-based graphics processing system that is operable to generate a render output by generating and storing primitive information representative of positions of primitives to be processed to generate the render output, and reading and using the primitive information to identify which primitives to process to generate a rendering tile of the render output; the method comprising:

reading, from a set of linked blocks of memory space, primitive information to be used to identify which primitives of a set of primitives to process to generate the rendering tile of the render output;

using the primitive information to identify which primitives of the set of primitives to process to generate the rendering tile; and processing the identified primitives to generate the rendering tile;

wherein at least one block of memory space of the set of linked blocks of memory space is a linking block of memory space that stores at least: (i) primitive information to be used to identify which primitives of the set of primitives to process to generate the rendering tile of the render output, (ii) a first link to a first other block of memory space of the set of linked blocks of memory space, and (iii) a second link to a second other block of memory space of the set of linked blocks of memory space; and wherein at least one of the first other block of memory space and the second other block of memory space is a non-linking block of memory space that stores primitive information to be used to identify which primitives of the set of primitives to process to generate the rendering tile of the render output, and does not store any links to other blocks of memory space of the set of linked blocks of memory space.

10. The method of claim 9, comprising:

locating plural different memory space blocks of the set using plural different links stored in the same block; and reading and using primitive information from the plural different memory space blocks at the same time.

11. A tile-based graphics processing system that is operable to generate a render output by generating and storing primitive information representative of positions of primitives to be processed to generate the render output, and reading and using the primitive information to identify which primitives to process to generate a rendering tile of the render output; the graphics processing system comprising:

a generating circuit configured to generate primitive information to be used to identify which primitives of a set of primitives to process to generate the rendering tile of the render output; and a storing circuit configured to store primitive information generated by the generating circuit in a set of linked blocks of memory space;

wherein at least one block of memory space of the set of linked blocks of memory space is a linking block of memory space that stores at least: (i) primitive information to be used to identify which primitives of the set of primitives to process to generate the rendering tile of the render output, (ii) a first link to a first other block of memory space of the set of linked blocks of memory space, and (iii) a second link to a second other block of memory space of the set of linked blocks of memory space; and wherein at least one of the first other block of memory space and the second other block of memory space is a non-linking block of memory space that stores primitive information to be used to identify which primitives of the set of primitives to process to generate the rendering tile of the render output, and does not store any links to other blocks of memory space of the set of linked blocks of memory space.

12. The system of claim 11, wherein the storing circuit is configured to store primitive information in the set of linked blocks of memory space by:

storing primitive information in the linking block of memory space; and when the linking block of memory space is full of primitive information: adding the first other block of memory space to the set of linked blocks of memory space, storing primitive information in the first other block of memory space, and storing the first link to the first other block of memory space in the linking block of memory space; and when the first other block of memory space is full of primitive information: adding the second other block of memory space to the set of linked blocks of memory space, storing primitive information in the second other block of memory space, and storing the second link to the second other block of memory space in the same linking block of memory space as the first link to the first other block of memory space.

13. The system of claim 11, wherein the storing circuit is configured to store primitive information in a set of linked blocks of memory space by, for one or more packets of primitives:

determining whether the set of linked blocks of memory space has insufficient memory space available to store primitive information for the respective packet of primitives; and when it is determined that the set of linked blocks of memory space has insufficient memory space available to store primitive information for the respective packet of primitives:

adding a block of memory space to the set of linked blocks of memory space; and storing primitive information for the respective packet of primitives in memory space of the block of memory space added to the set of linked blocks of memory space.

14. The system of claim 11, wherein the primitive information represents primitive lists.

15. The system of claim 11, wherein the primitive information represents bounding boxes.

16. The system of claim 15, wherein the storing circuit is configured to:

store, in each respective block of memory space, bounding box information that defines at least two different levels of a respective hierarchy of bounding boxes.

17. The system of claim 16, wherein the storing circuit is configured to store bounding box information that defines at least two different levels of a respective hierarchy of bounding boxes in a respective block of memory space by:

for one or more packets of primitives:

generating a packet bounding box that bounds all of the primitives of the respective packet;

storing the packet bounding box in the respective block of memory space; and updating, in the respective block of memory space, one or more related higher-level bounding boxes that bound the packet bounding box.

18. A tile-based graphics processing system that is operable to generate a render output by generating and storing primitive information representative of positions of primitives to be processed to generate the render output, and reading and using the primitive information to identify which primitives to process to generate a rendering tile of the render output; the graphics processing system comprising:

a primitive providing circuit configured to:

read, from a set of linked blocks of memory space, primitive information to be used to identify which primitives of a set of primitives to process to generate the rendering tile of the render output; and use the primitive information to identify which primitives of the set of primitives to process to generate the rendering tile; and a rendering circuit configured to generate the rendering tile of the render output by processing primitives identified by the primitive providing circuit;

wherein at least one block of memory space of the set of linked blocks of memory space is a linking block of memory space that stores at least: (i) primitive information to be used to identify which primitives of the set of primitives to process to generate the rendering tile of the render output, (ii) a first link to a first other block of memory space of the set of linked blocks of memory space, and (iii) a second link to a second other block of memory space of the set of linked blocks of memory space; and wherein at least one of the first other block of memory space and the second other block of memory space is a non-linking block of memory space that stores primitive information to be used to identify which primitives of the set of primitives to process to generate the rendering tile of the render output, and does not store any links to other blocks of memory space of the set of linked blocks of memory space.

19. The system of claim 18, wherein the primitive providing circuit is configured to:

locate plural different memory space blocks of the set using plural different links stored in the same block; and read and use primitive information from the plural different memory space blocks at the same time.

* * * * *